Oct. 23, 1945.                    A. NOVICK                        2,387,605
                          ENVELOPE FASTENER MACHINE
                          Filed Aug. 2, 1940              14 Sheets-Sheet 1

INVENTOR
*Abraham Novick*
BY
ATTORNEYS

Oct. 23, 1945.　　　A. NOVICK　　　2,387,605
ENVELOPE FASTENER MACHINE
Filed Aug. 2, 1940　　　14 Sheets-Sheet 6
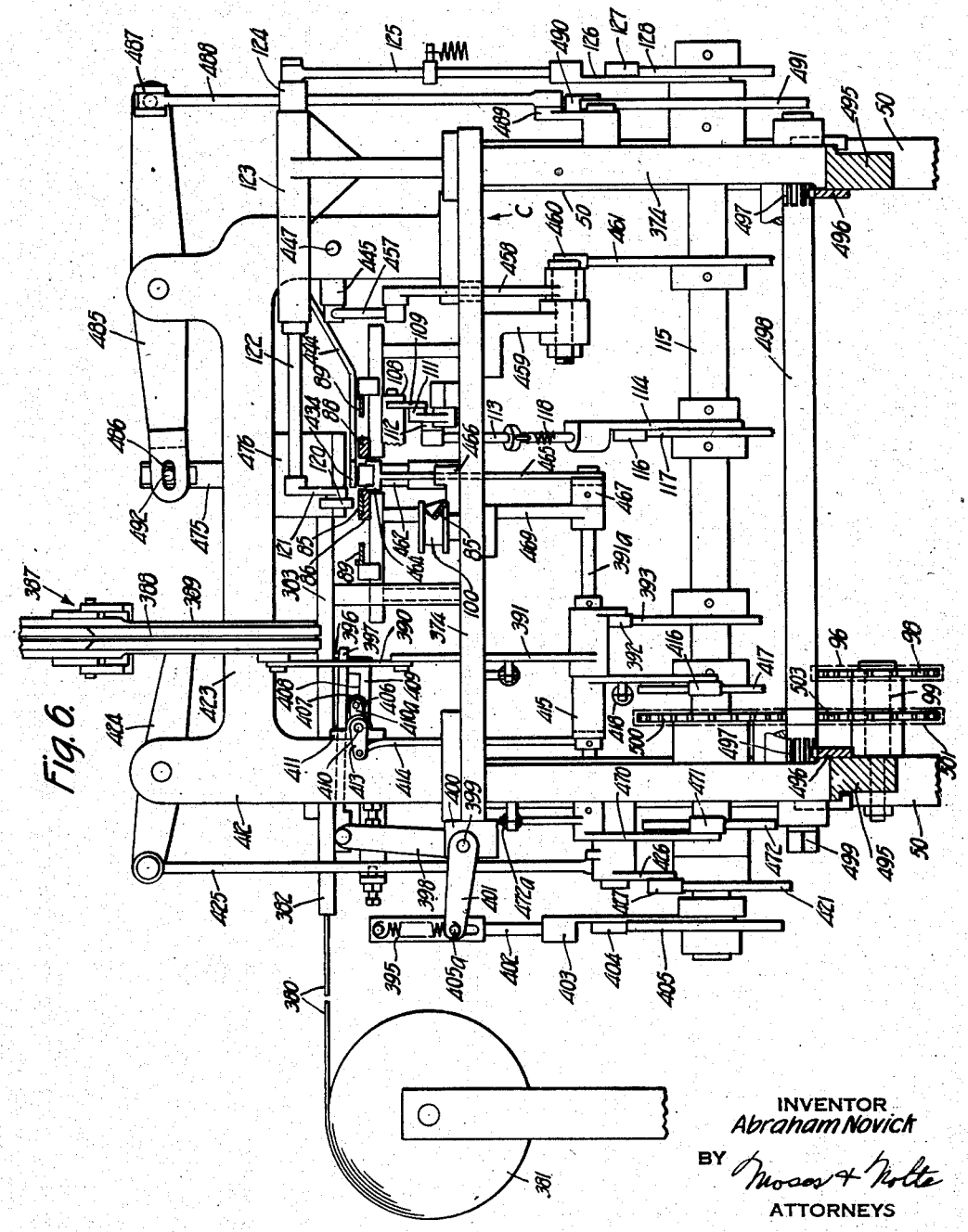
INVENTOR
Abraham Novick
BY Moses & Nolte
ATTORNEYS Oct. 23, 1945.  A. NOVICK  2,387,605
ENVELOPE FASTENER MACHINE
Filed Aug. 2, 1940   14 Sheets-Sheet 7
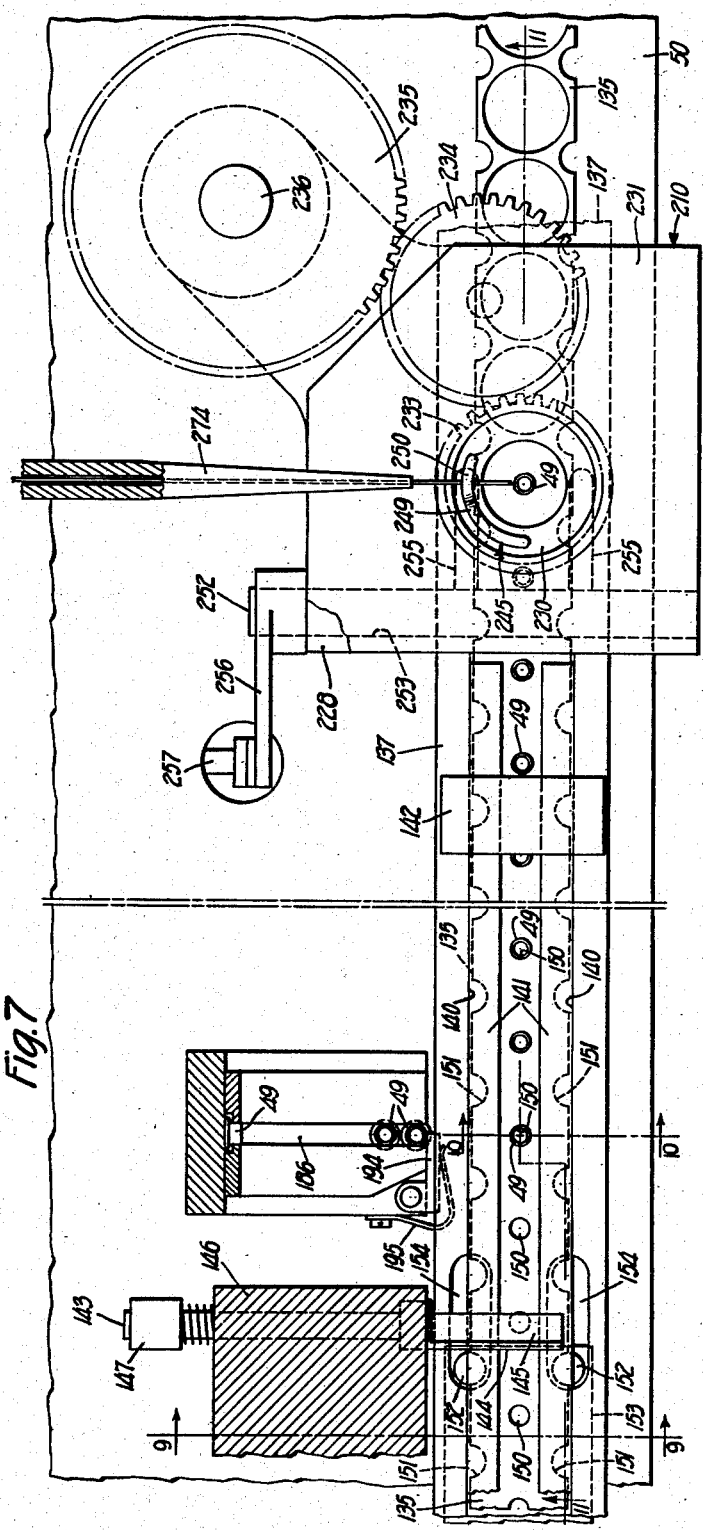
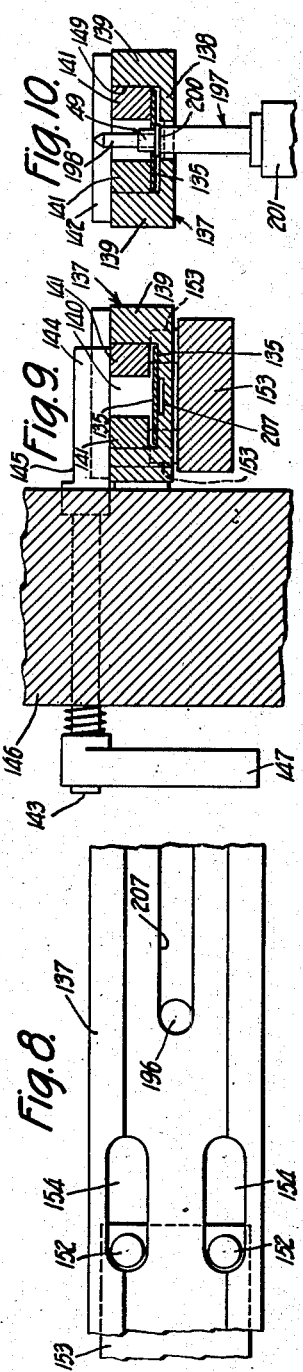
INVENTOR
*Abraham Novick*
BY *Moses & Nolte*
ATTORNEYS

Fig. 11.

Oct. 23, 1945. A. NOVICK 2,387,605
ENVELOPE FASTENER MACHINE
Filed Aug. 2, 1940 14 Sheets-Sheet 9
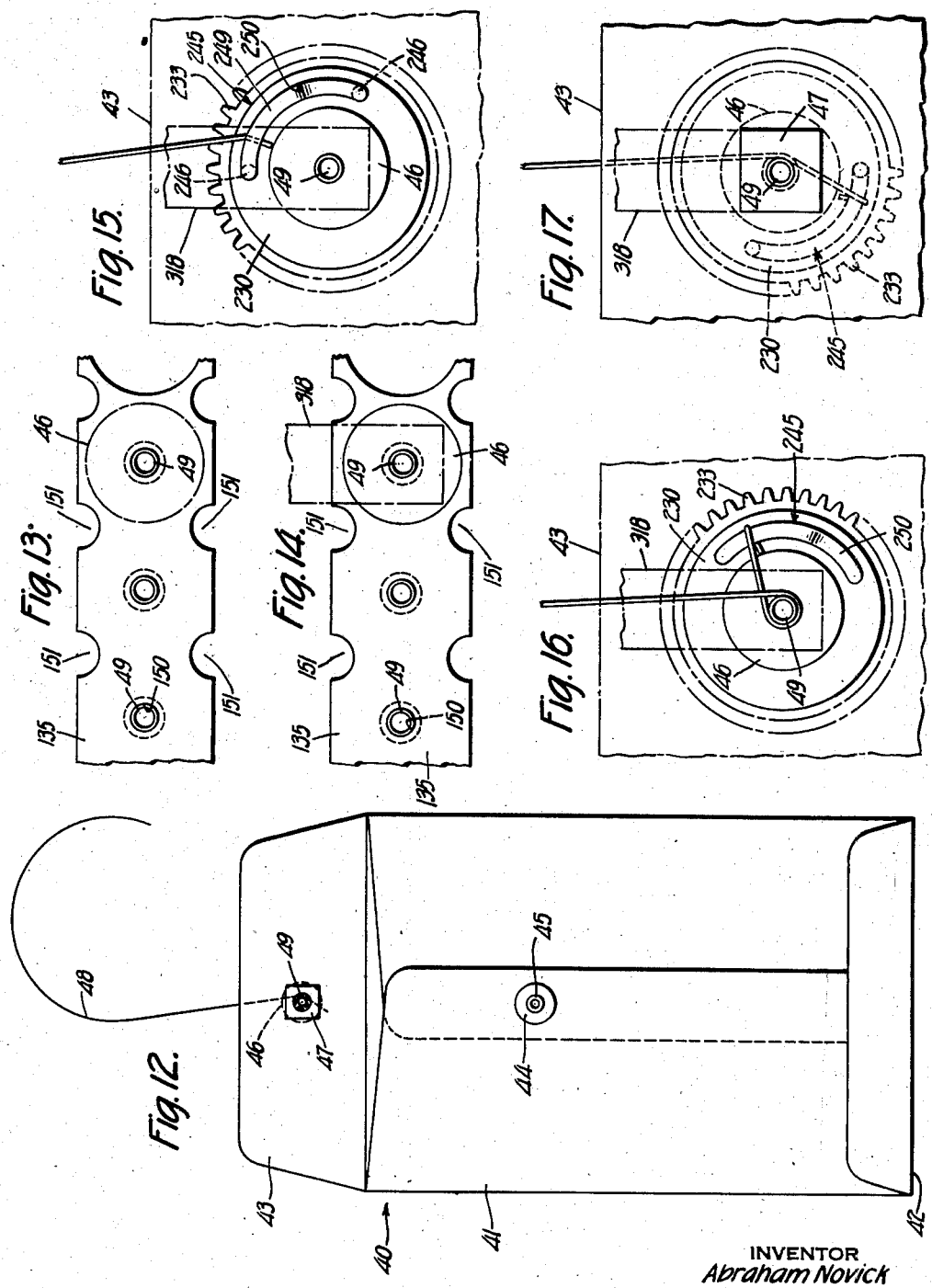
INVENTOR
*Abraham Novick*
BY *Moses + Nolte*
ATTORNEYS

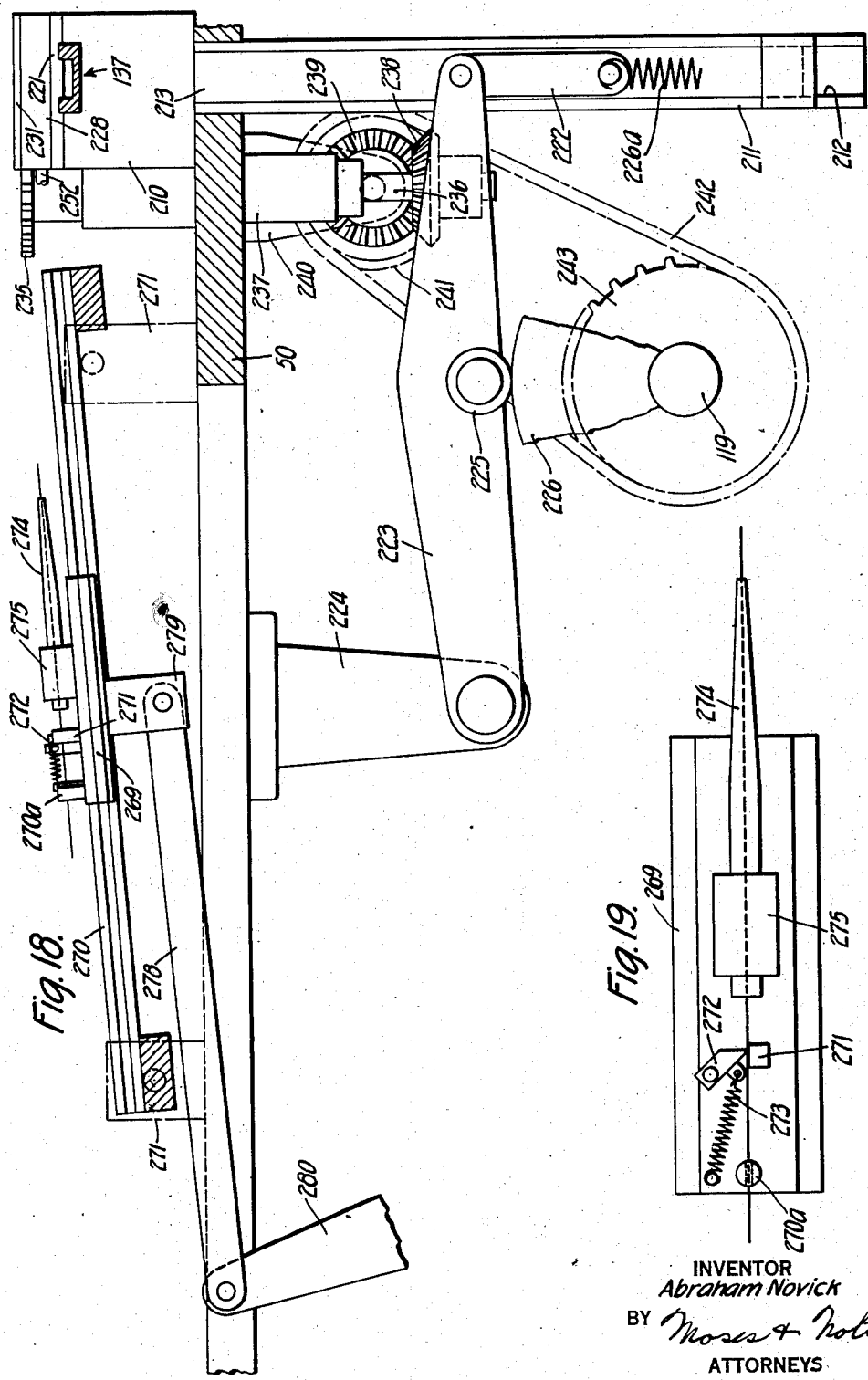

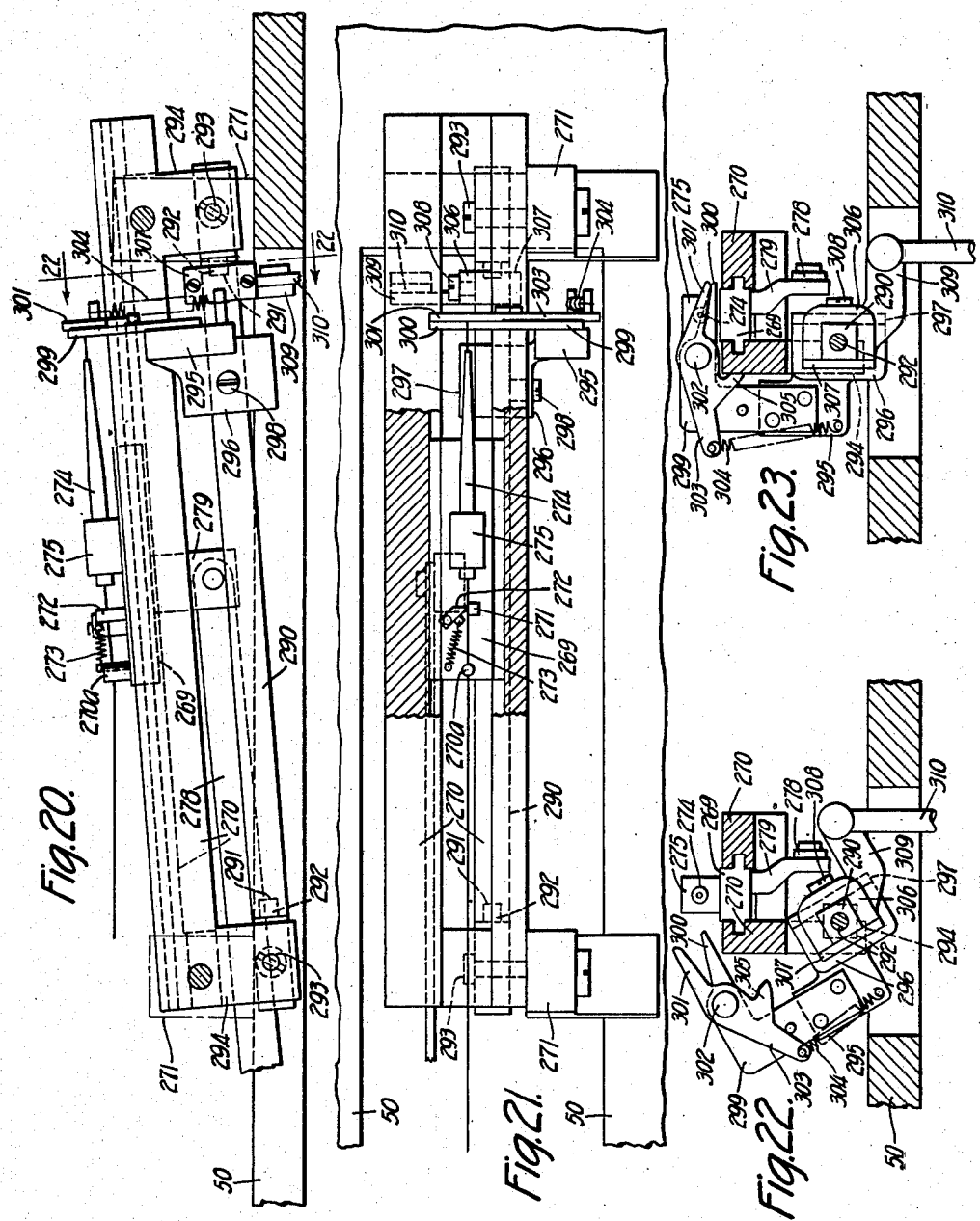

Oct. 23, 1945.  A. NOVICK  2,387,605
ENVELOPE FASTENER MACHINE
Filed Aug. 2, 1940   14 Sheets-Sheet 12
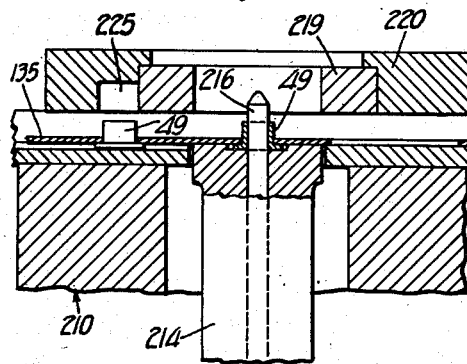
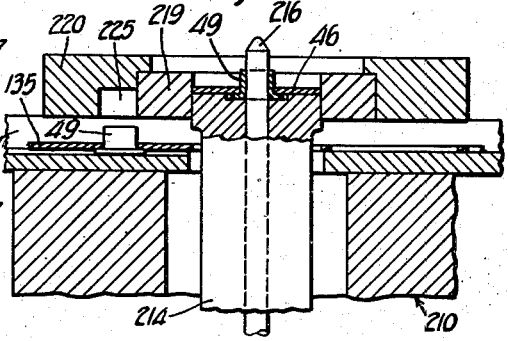
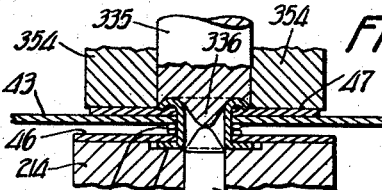
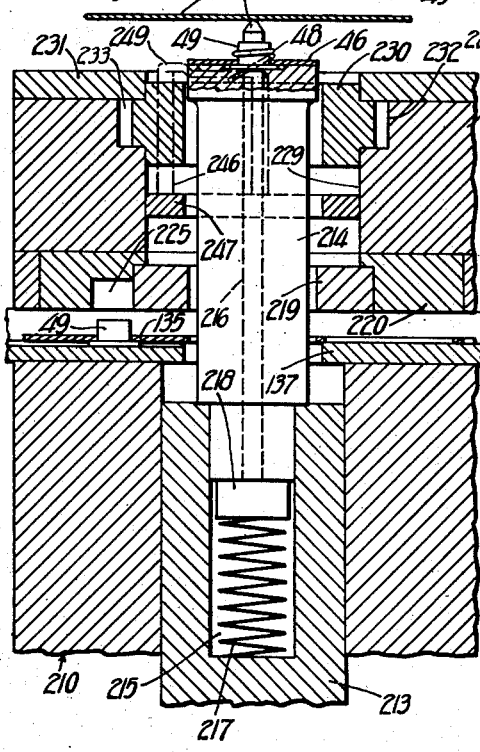
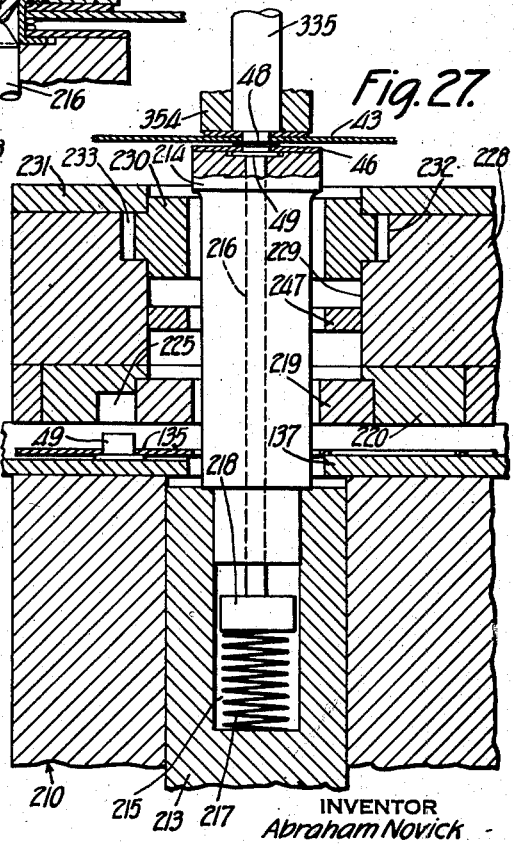
INVENTOR
Abraham Novick
BY Moses & Nolte
ATTORNEYS Oct. 23, 1945.     A. NOVICK     2,387,605
ENVELOPE FASTENER MACHINE
Filed Aug. 2, 1940     14 Sheets-Sheet 13
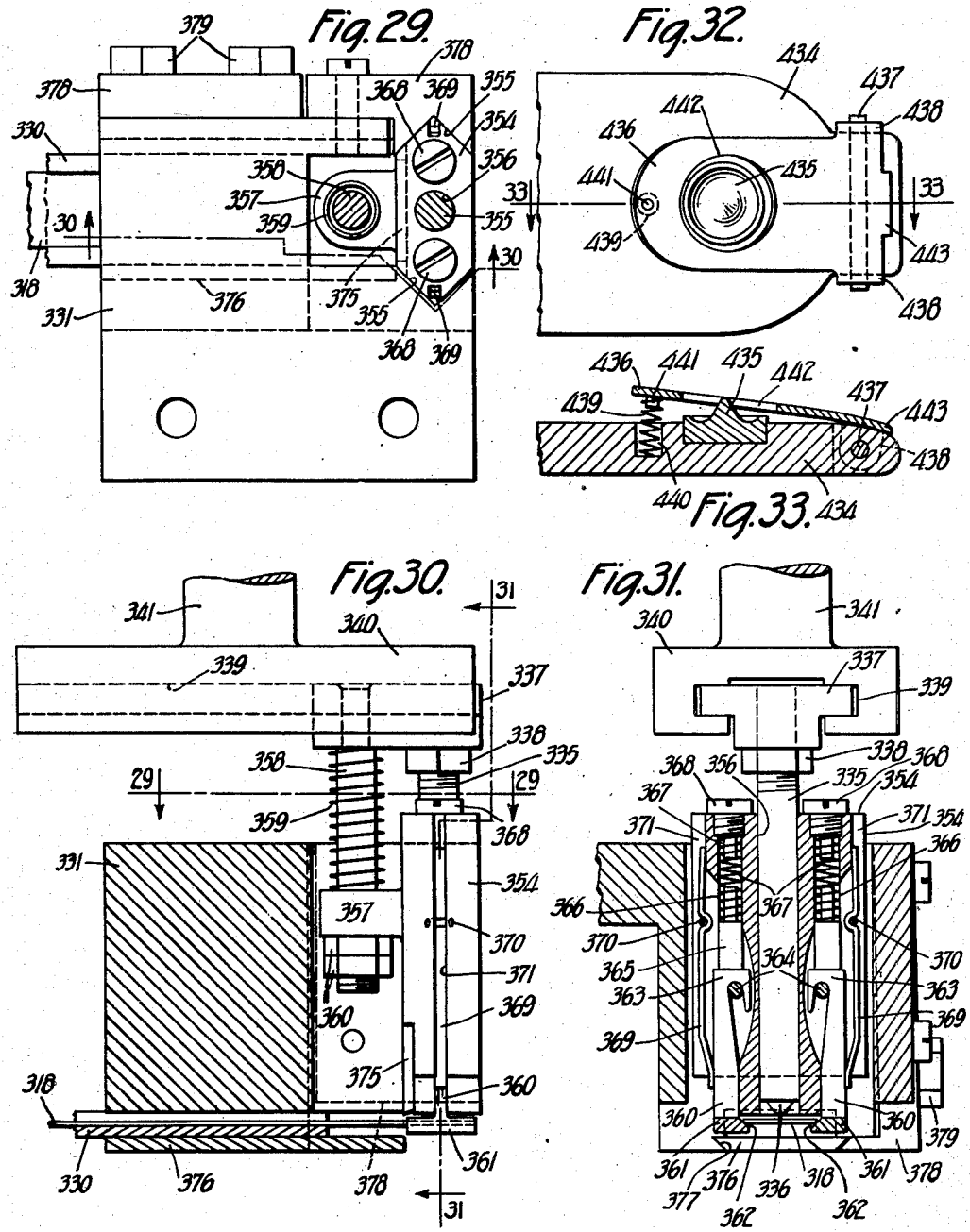
INVENTOR
*Abraham Novick*
BY
ATTORNEYS Oct. 23, 1945.   A. NOVICK   2,387,605
ENVELOPE FASTENER MACHINE
Filed Aug. 2, 1940   14 Sheets-Sheet 14
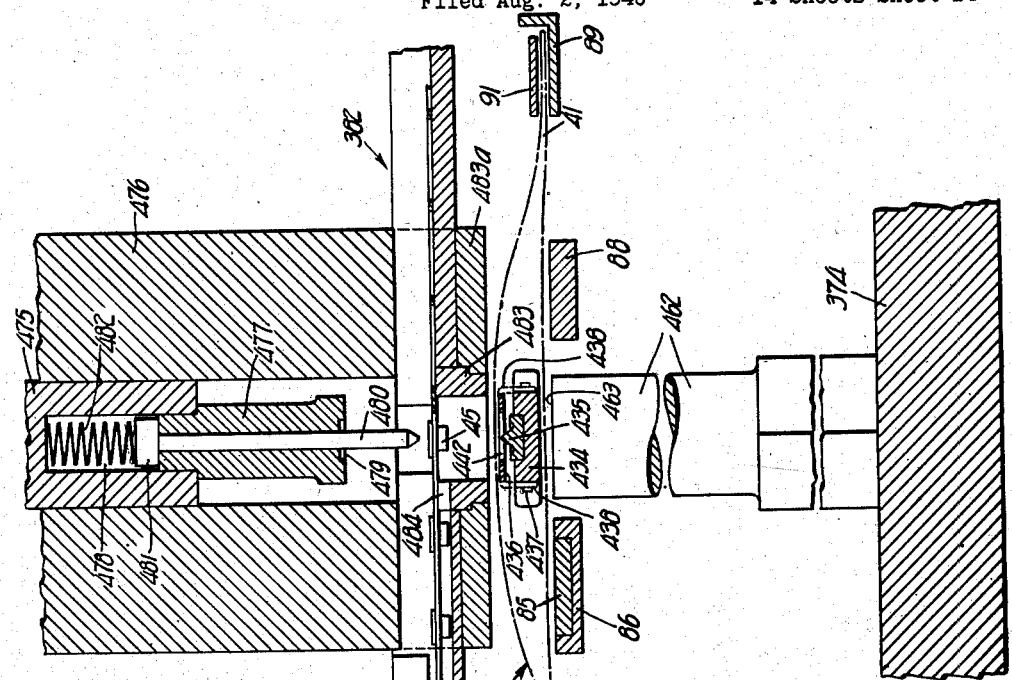
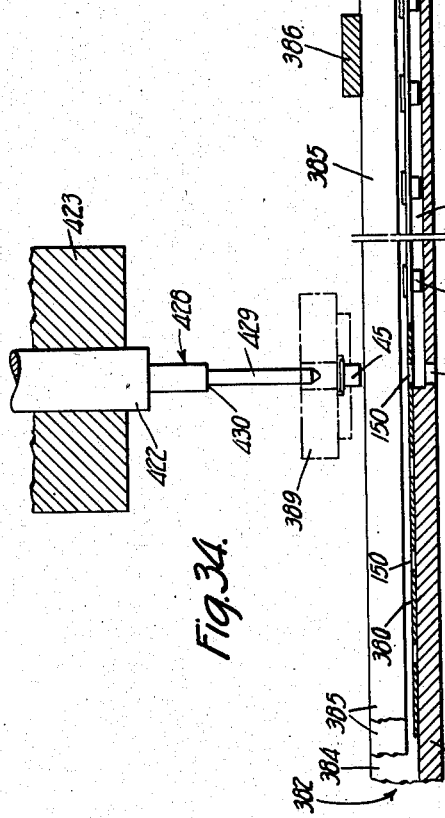
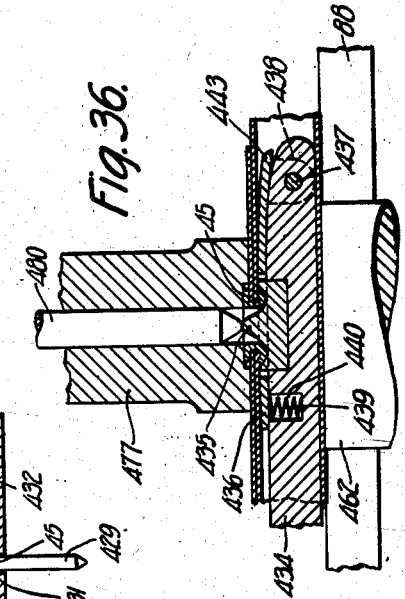
INVENTOR
*Abraham Novick*
BY *Moses + Nolte*
ATTORNEYS Patented Oct. 23, 1945

2,387,605

UNITED STATES PATENT OFFICE 2,387,605

ENVELOPE FASTENER MACHINE

Abraham Novick, Flushing, N. Y., assignor to F. L. Smithe Machine Co., Inc., New York, N. Y., a corporation of New York Application August 2, 1940, Serial No. 349,960

33 Claims. (Cl. 93—61)

This invention relates to improvements in envelope machines, and is particularly directed to features embodied in an improved automatic machine for applying fasteners of the button and string type to the flap and body portions of envelopes. Fasteners of this type are composed of a body member formed from a button attached to the body of the envelope by a suitable fastening element, ordinarily an eyelet, and a similar flap member carrying a length of string.

A principal feature of the invention is the combination, in a practical and efficient machine, of means for applying the button fastener members to the body and flap portions of an envelope with means for automatically feeding envelopes in synchronized sequence to the applying station and discharging the envelopes therefrom. Machines for applying fastener elements of this type have heretofore been fed by hand, and have been arranged for manual insertion of the flap end of the envelope in proper position in the machine. Where operations on the envelope body have been carried out it has been necessary to locate the envelope with a portion of the mechanism extending into the envelope mouth, which could readily be accomplished manually. Automatic envelope feed arrangements have also been known, but have not been suitable for use in feeding envelopes to mechanism for applying button and string fastener members, owing to the necessity for arranging parts of the latter type of mechanism on opposite sides of the body and flap of the envelope, and the consequent interference between the known button fastener applying mechanisms and the known conveyor arrangements. Important features of the invention therefore include improvements in both the construction and the arrangement of the fastener applying mechanisms and of the conveyor structure, adapted to permit their use in combination.

Another feature of the invention is the provision of a novel arrangement for forming and applying the buttons and eyelets. This arrangement includes the provision of a strip of suitable stiff button material, advantageously provided with prepunched openings for receiving fastening elements. In the preferred form such elements consist of eyelets which are positioned in the openings by improved means and are advanced with the strip to a station where buttons, each carrying an eyelet, are successively excised from the strip, each eyelet-carrying button being then applied to an envelope. The invention includes an improved arrangement whereby the excising of a button and its application to an envelope are carried out at the same station and by associated parts forming a single unit.

An improved construction and arrangement for automatically applying the string to the fastener is also provided.

A further feature of the invention includes the provision of button material in the form of a strip prepunched to receive the fastening elements and arranged in a roll which may be conveniently mounted on the machine to form a button supply. Since the fastener elements are mounted on the strip in advance and the strip carrying such elements constitutes a supply of the entire button-forming structure (except the patch and string, where these elements are used), a specific feature of the invention is the provision of a strip of button-forming material carrying attaching elements at intervals suitable for excising the buttons and applying them by means of said elements in succession.

Envelopes of the type to which such fasteners are generally applied vary substantially in size and in the spacing between the points of fastener application. A feature of the invention is the provision of an arrangement whereby the fastener members may readily be applied simultaneously to the flaps and the body portions of envelopes varying both in overall dimensions and in said spacing. This is in general accomplished by mounting substantially the entire mechanism employed for applying one of the fastener members on a movable support which is adjustable without interference with the feed and drive connections to the other fastener applying station, and by employing adjustable envelope-positioning means such as stops.

A further feature of the invention comprises an improved automatic envelope conveying construction of the belt type arranged to permit operations on both faces of the envelope along the center line thereof, and in particular to facilitate the location of operating mechanism directly below the path of travel of the envelope in line with the usual path of return belt travel, without interference with the belt. This feature includes the lateral deflection of a portion of the return run of the belt means, and/or the use of a laterally offset belt.

Other objects, features and advantages will appear from the following description of a preferred embodiment of the invention, considered in connection with the accompanying drawings in which Fig. 1 is a side elevation of the feed end of an envelope fastener applying machine, showing particularly the feed mechanism and the mechanism for forming and applying the button and string fastener member to the envelope flap;

Fig. 6 is a similar view on line 6—6 of Fig. 2;

Fig. 7 is a detail plan view of button strip feeding, eyelet inserting and button forming and applying mechanisms at the commencement of the strip feed;

Fig. 8 is a detail plan view of the strip feeding and eyelet inserting portion of the button strip feed channel;

Fig. 9 is a detail section on line 9—9 of Fig. 7;

Fig. 10 is a detail section on line 10—10 of Fig. 7;

Fig. 11 is a vertical section on line 11—11 of Fig. 7;

Fig. 12 is a plan view of an envelope provided with button and string fastener members of the type applied by this machine;

Fig. 13 is a detail plan view of a portion of the button-forming strip with eyelets in place, indicating an area that will be excised to form a button;

Fig. 14 is a similar view after the button is excised, showing the location of the end of the reenforcing patch strip;

Fig. 15 is a partly diagrammatic plan view of the string applying mechanism at the commencement of the string winding operation;

Fig. 16 is a similar view showing the winding partially completed;

Fig. 17 is a similar view with the envelope and reenforcing patch in place, at about the end of the string winding step;

Fig. 18 is a side elevation of the string supply mechanism with parts broken away;

Fig. 19 is a detail plan view of the string supply carriage;

Fig. 20 is a detail side elevation showing the string supply carriage, guideway and scissors with the latter in operative position;

Fig. 21 is a plan view of the same structure with parts broken away;

Fig. 22 is a section on line 22—22 of Fig. 20 showing the scissors in retracted position;

Fig. 23 is a similar view with the scissors in operative string-cutting position;

Fig. 24 is a fragmentary vertical section of the button-forming mechanism on the same line as Fig. 11 but at a later stage, immediately prior to punching out the button;

Fig. 25 is a similar view after the button has been punched;

Fig. 26 is a similar view of the next stage with the parts in position for winding the string;

Fig. 27 is a similar view of the following stage with the parts in eyelet-upsetting position;

Fig. 28 is a fragmentary enlarged sectional view of the fastener parts as shown in Fig. 27;

Fig. 29 is a fragmentary plan view of the reenforcing patch applying head on line 29—29 of Fig. 30;

Fig. 30 is a sectional side elevation of said head on line 30—30 of Fig. 29;

Fig. 31 is a vertical transverse sectional view of said head on line 31—31 of Fig. 30;

Fig. 32 is a fragmentary plan view of the anvil tip which is inserted in the envelope;

Fig. 33 is a vertical sectional view on line 33—33 of Fig. 32;

Fig. 34 is a vertical sectional view through the mechanism for forming and applying the button fastener to the envelope body;

Fig. 35 is a detail vertical sectional view of the eyelet-inserting device in Fig. 34, shown in lowermost operative position; and Fig. 36 is a fragmentary vertical section of the fastener-applying parts in Fig. 34 showing the application and clinching of the body button member to the envelope.

Figure 1:
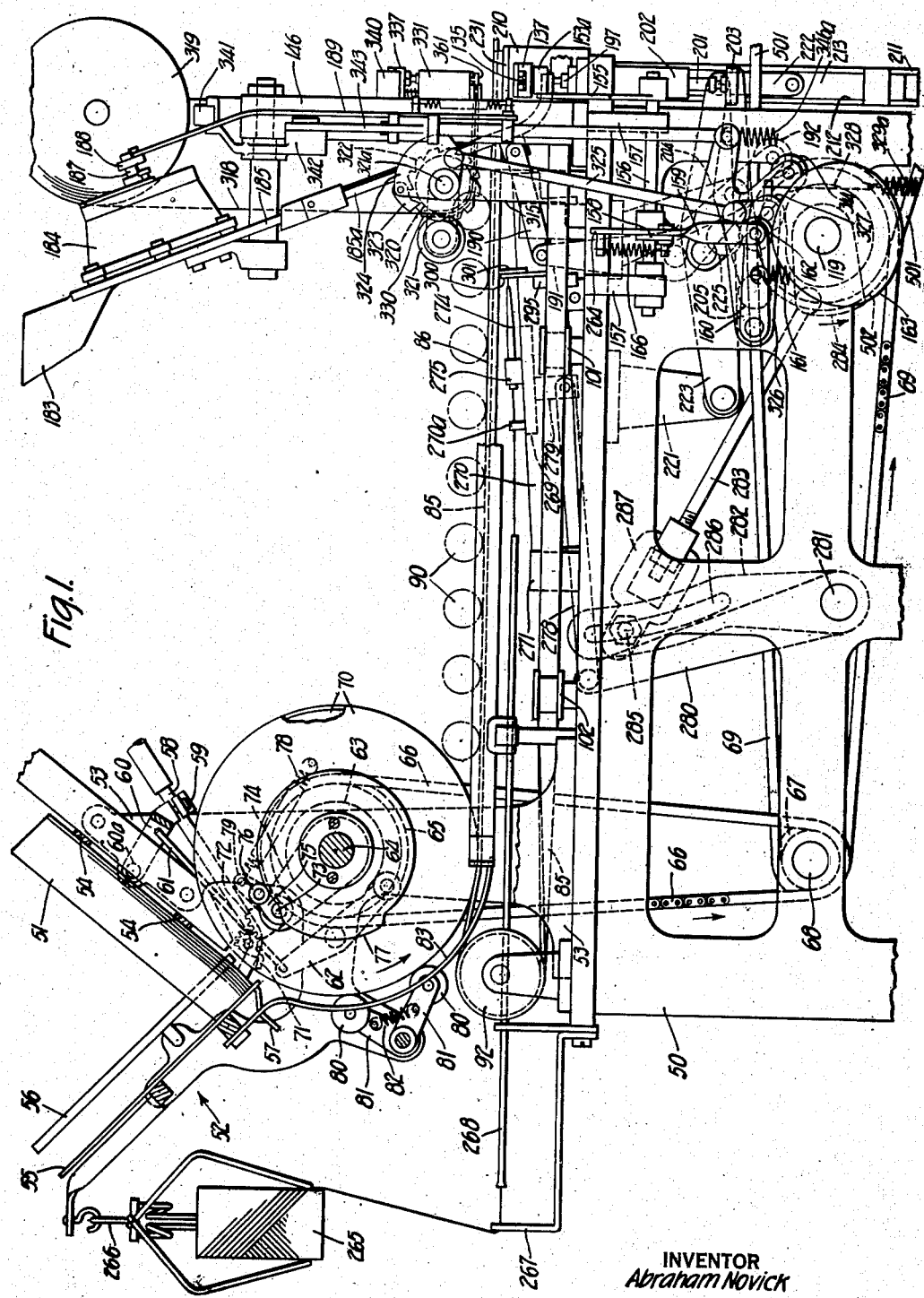
Figure 2:
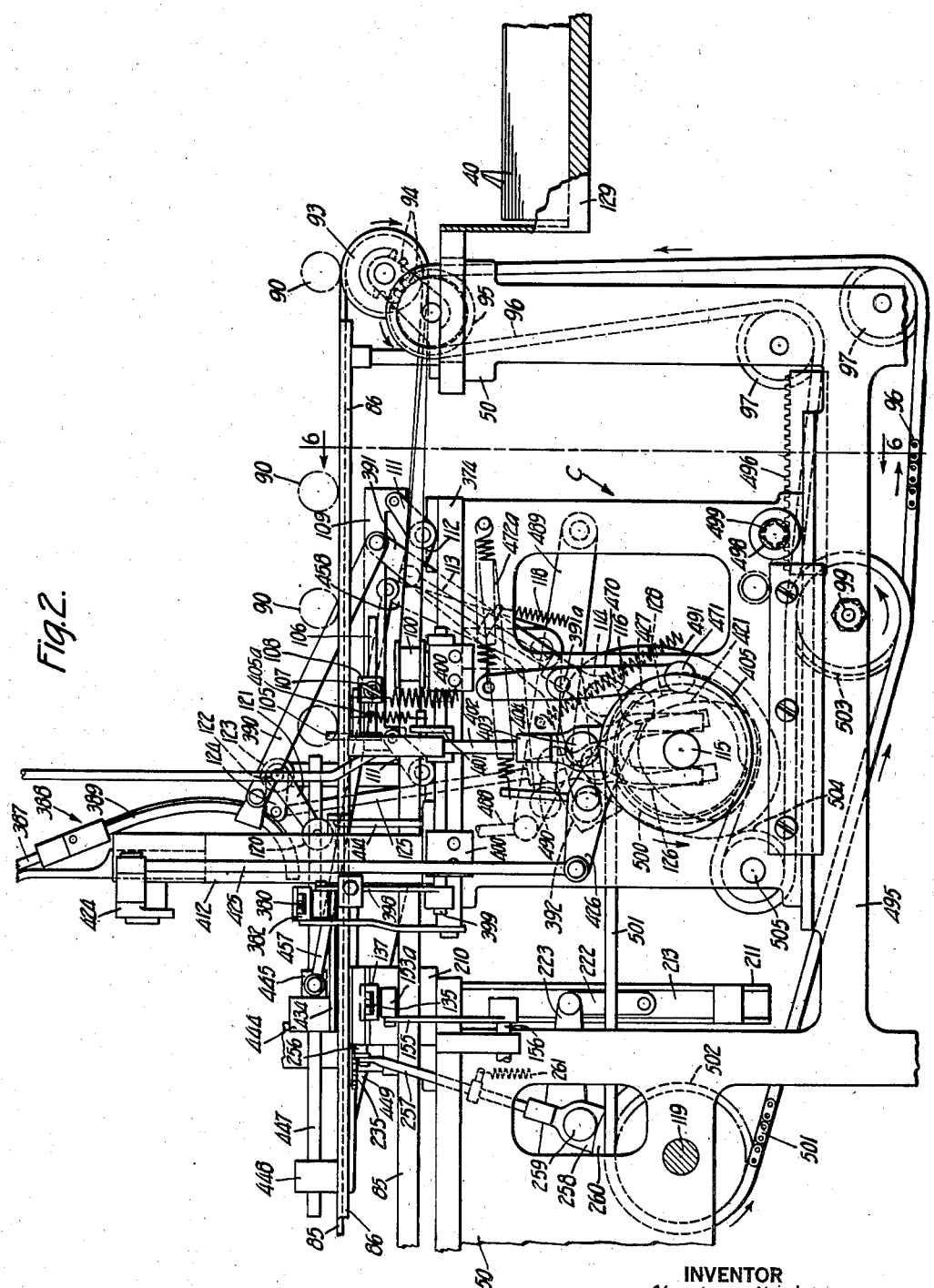
Fig. 2 is a side elevation of the discharge end of said machine, slightly overlapping Fig. 1 and showing particularly the mechanism for forming and applying a button fastener to the envelope body.
Figure 3:
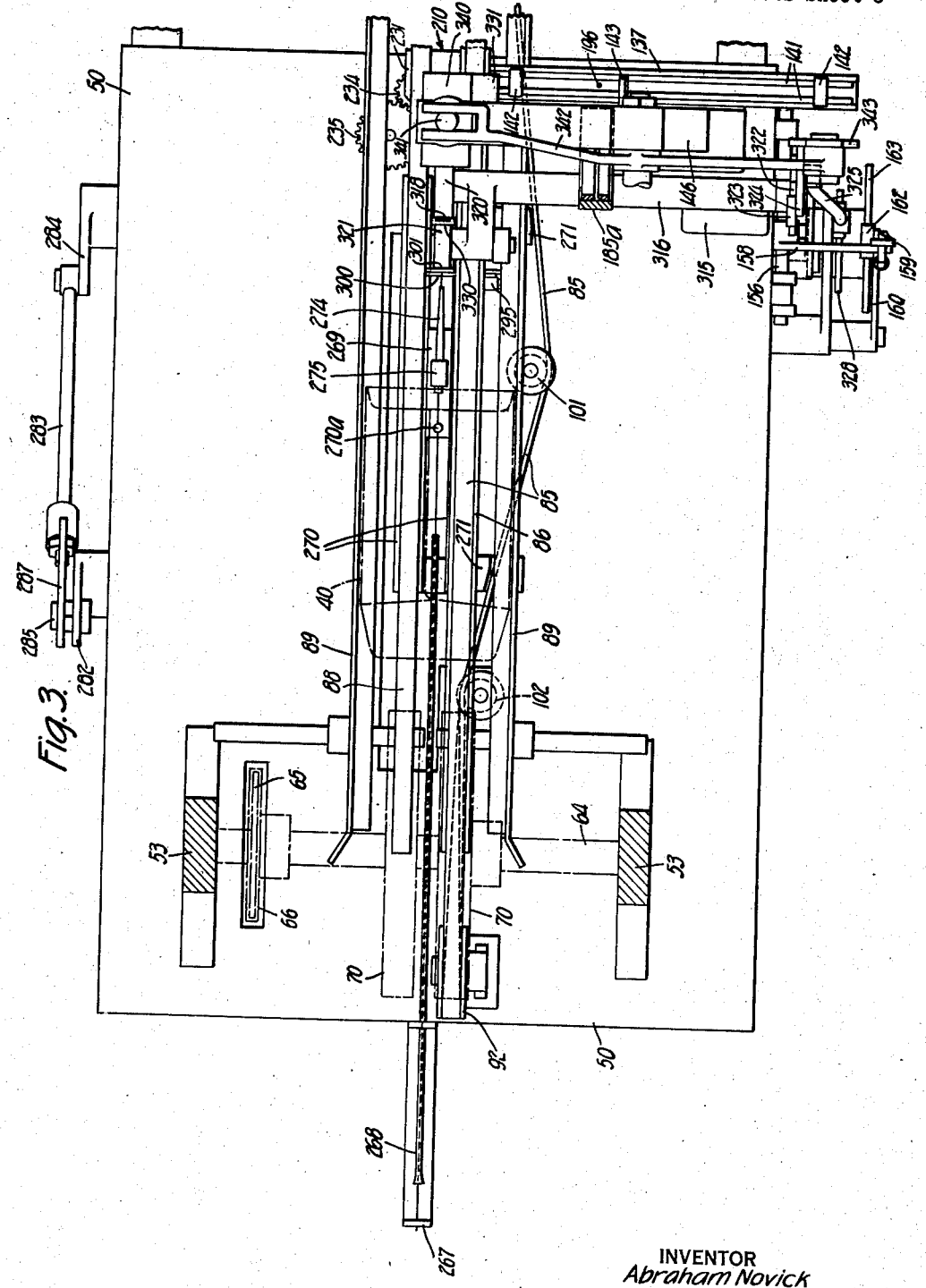
Fig. 3 is a plan view of the part of the machine shown in Fig. 1 with parts omitted.
Figure 4:
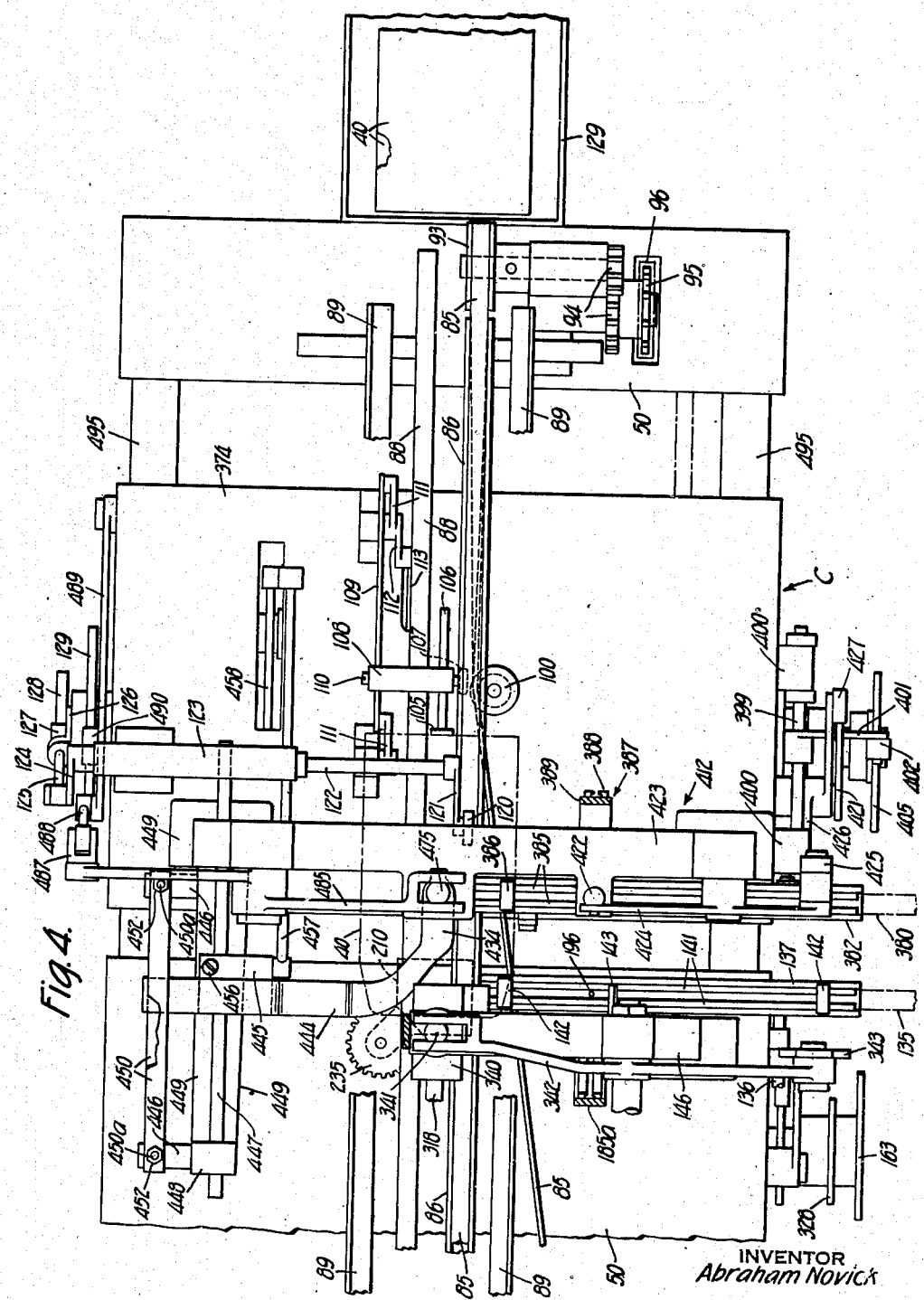
Fig. 4 is a plan view of the part of the machine shown in Fig. 2 with parts omitted.

The general arrangement and organization of the machine will first be indicated to facilitate an understanding of the detailed description. At the left as viewed in Figures 1-4 an envelope feeding device is mounted above a horizontal conveyor which receives the envelopes from the feeder with the flaps trailing and the openings uppermost. Each envelope is arrested by a suitable stop at the operating station, at which a button and string fastener member is applied to the lower face of the flap and fixed in position by an eyelet, upset through a reenforcing patch applied to the upper face of the flap. The end of the string supply is wrapped around the eyelet prior to insertion of the eyelet through the flap, the string is cut to the proper length, and a suitable patch is cut from the end of a patch strip and applied to the upper face of the flap, being held in place while the eyelet is forced through the flap and patch and upset against the patch to hold the button assembly in place. Simultaneously a cooperating button fastener member is mounted on the upper face of the body of the envelope by an eyelet upset against an anvil inserted in the envelope. After these operations are concluded the stop recedes and the envelope travels to discharge at the right hand end of the machine.

The buttons are punched from button strips fed from rolls mounted on the side of the machine. The eyelets are inserted in preformed holes in the strips and are carried by said strips to the point of application, where the buttons are punched out.

In order to provide for variations in spacing between the buttons with different sizes and types of envelope, the entire mechanism for applying the button fastener to the envelope body, including the button strip feed, the eyelet feed, the anvil and the applying mechanism, are mounted on a longitudinally adjustable carriage.

The illustrated embodiment of the invention will now be described in detail. The fastener elements, and a type of envelope to which such elements are commonly attached, are illustrated in Fig. 12. The envelope 40 includes a body 41 having an end 42 and a flap 43. The body fastener button 44 is held in place by an eyelet 45, while the flap fastener button 46, the reenforcing patch 47 and the piece of string 48 are attached to flap 43 by eyelet 49.

A suitable automatic envelope feeding device substantially the same as that disclosed in my pending application Serial No. 263,626 is mounted at the left of frame 50 as viewed in Figures 1-4, and is of a type suitable for feeding envelopes individually in succession and in synchronism from a stack or pile to a horizontal conveyor. In the embodiment illustrated, stack 51 of envelopes is supported in a suitable magazine 52 mounted on standard 53 on frame 50. The magazine comprises floor bars 54, bottom plates 55 and side rails 56. A stripper finger 57 of known type is positioned to engage the lower edge portion of the bottom envelope to prevent feeding more than one envelope.

Sucker tube 58 is secured by clamp 59 to a rocking bail 60 pivoted on standards 53 and driven through sprocket 65 and chain 66 from sprocket 67 on front shaft 68 journaled in frame 50. Shaft 68 is driven through sprocket chain 69 from front cam shaft 119.

The lower edge of each envelope is deflected to the right, Fig. 1, by suction tube 58 into contact with the peripheries of hollow feed discs 70, mounted on feeder shaft 64 and provided with means for gripping the lower envelope edge to carry each envelope down and rearwardly to the horizontal conveyor. The gripping means for each disc comprises a gripping finger 71 pivoted between the side walls of the hollow disc 70 and oscillated through a suitable opening in the peripheral face of the disc to grip the lower edge of the envelope against said face. The arrangement for oscillating each finger 71 comprises a toothed sector 72 meshing with a corresponding toothed portion of finger 71 and mounted on a rock shaft 73, extending through both discs 70 and journaled at its ends on support arms 74 fixed to shaft 64. An actuating arm 75 is mounted on one end of rock shaft 73 and carries a roller 76 held against stationary cam 77 mounted on the adjacent standard 53, the roller and cam being maintained in engagement by spring 78 attached at one end to a disc 70 and at the other end to an arm 79 fixed to shaft 73. The envelopes conveyed by discs 70 are suitably held against the discs as by rollers 80 on arms 81 pivotally mounted on the standards 53 and biased toward the disc surfaces by spring 82, suitable guide rails 83 cooperating to hold each envelope in position adjacent the disc surfaces.

The feed device is operated by rocking the sucker tube 58 to shift the lower portion of the lowermost envelope in stack 51 over finger 57 and against rotating feed discs 70. Gripping fingers 71 are swung upwardly by cam 77 and grip the lower margin of the envelope against the discs, which draw the envelope downwardly over floor bars 54 and discharge it at the feed end of the horizontal conveyor, now to be described, by properly synchronized retraction of the gripping fingers 71.

The conveyor is of the belt type, including belt 85 traveling below the path of the envelopes and propelling them through the machine. The upper run of belt 85 is supported by a bar 86 having side flanges 87 (Figure 11) extending along the sides of the belt and below the upper belt surface. Belt 85 is offset laterally from the center line of the envelope path sufficiently to permit operations on the envelopes along said central line without interference with the belt. At a similar distance at the other side of said center line an envelope-supporting rail 88 extends parallel to and in horizontal alignment with belt 85. Envelope guide angles 89 are located along the side margins of the envelope path and serve to guide and register the envelopes transversely.

Suitable provision is made for holding the envelopes in engagement with belt 85 and rail 88, including presser rolls 90 and retaining strips 91 (Fig. 11) located slightly above the horizontal flanges of guide angles 89. Belt 85 passes over idler pulley 92 at the feed end and drive pulley 93 at the discharge end, both mounted on the frame 50. The drive pulley 93 is driven through pinions 94 and sprocket 95 by chain 96 passing over idler sprockets 97 and drive sprocket 98 (Fig. 6) on stub shaft 99 journaled on frame 50.

The lower run of belt 85 is arranged to permit the location of operating mechanism adjacent the lower face portions of the envelopes at the operating station. For this purpose said run is given a half twist at each end so that it may be deflected laterally to the desired extent along the desired portion of the envelope path, by passing the belt around suitably arranged pulleys. In the construction illustrated the lower run of the belt traveling from drive pulley 93 is given a half twist before passing over vertical axis pulley 100, then is deflected laterally and beyond the vertical projection of the envelope path, passing around vertical axis pulley 101 and thence back around vertical axis pulley 102, from which it extends with a half twist to idler pulley 92.

An appropriate stop is provided for arresting each envelope in proper position for attachment of the fastener elements and thereafter releasing the envelope for continued travel to discharge. The illustrated arrangement includes a stop 105 (Figs. 2 and 4), extending upwardly from the end of rod 106, which is releasably clamped for longitudinal adjustment by set screw 107 in a bore in stop holder 108 adjustably clamped at any desired point along stop support link 109 by set screw 110. Link 109 is pivoted at its ends to parallel rock arms 111 pivotally mounted on the carriage C, the rearward arm 111 being provided with an extension 112 pivotally connected to rod 113 (Figs. 2 and 6) carrying fork 114, slidably fitting over the rear cam shaft 115 and carrying roller 116 held against cam 117 on said shaft by spring 118.

Prompt discharge of each envelope after release by the stop 105 may be assisted by providing means synchronized with the stop for pressing the envelope against belt 85 as soon as the envelope is released. The arrangement illustrated is referred to as a stripper and includes a roller 120 in register with belt 85 and moved into and out of pressing engagement with an envelope on said belt. For this purpose roller 120 is mounted on arm 121 (Figs. 2, 4 and 6), carried by rock shaft 122 journaled in an elongated bearing in bracket 123, mounted on the carriage C and fixed at its opposite end to rock arm 124 connected by rod 125 to fork 126 slidably engaging rear cam shaft 115 and carrying cam roller 127 held against cam 128 on said shaft.

In operation, the envelope stop 105 is lifted by the action of cam 117, rocking arms 111 and thereby raising link 109, holder 108 and stop 105 mounted thereon to upper position in which stop 105 extends between belt 85 and rail 88 across the path of the envelope. During the dwell of the envelope against the stop, stripper roller 120 is held in elevated position by cam 128. Upon completion of the attachment of the fastener members to the envelope, stop 105 is swung rearwardly and downwardly by cam 117, and roller 120 is depressed, forcing the envelope against belt 85 and assuring prompt discharge of the envelope from operating position to avoid delay in positioning the succeeding envelope for fastener attachment. The envelope then passes beneath additional presser rolls 90 (Fig. 2) and is discharged to a suitable receiver 129.

While each envelope 40 is held in operating position a button fastener member carrying a length of string is attached to the envelope flap. The mechanism for this operation includes button supply means; eyelet feeding and positioning means; means for supplying and applying the string; means for supplying and applying a reenforcing patch to the upper surface of the flap; and means for punching out the button and upsetting the eyelet in place.

A feature of the button strip supply construction, as already noted, involves the positioning of the attaching elements in or on the strip substantially in advance of the button severing station. With this arrangement the mechanism for inserting the eyelet or other fastener elements may be located at a convenient point on the machine, simplifying the design and avoiding the congestion of mechanism at the button applying station.

The preferred arrangement, indicated in detail in Figures 9-16, punches the button element from a strip of suitable stiff cardboard or the like 135 (Figure 13). This strip is supplied from a feed roll 136 mounted at one side of the machine (Figs. 5, 7-10) from which the strip passes into a guideway 137 formed with a base plate 138 and side flanges 139 forming a feed channel 140 fitting strip 135. Suitable retaining means is provided in channel 140 to hold strip 136 in place, the illustrated form including hold-down bars 141 extending along the sides of channel 140 close to the upper face of strip 135 and connected by cross bars 142 resting on flanges 139. Bars 141 are held down in operative position by a suitable clamp, including clamp rod 143 (Figs. 7, 9, 11) having a cylindrical surface 144 bearing against the upper faces of bars 141 when in operative position, and a cut-away face 145 providing sufficient clearance when in alignment with bars 141 to permit the bars to be lifted and removed from feed channel 140. Clamp rod 143 is rotatably mounted in the lower part of bracket 146 and is operated by handle 147 arranged so that when the handle is lowermost the clamping face 144 is in engagement with bars 141.

Suitable means is provided for feeding strip 135 along channel 140 step by step. In the preferred form shown the strip 135 is provided with a series of center eyelet-receiving openings 150; and it is desirable, for reasons that will hereafter appear, to avoid marring or distorting the edges of these openings. It is also necessary to feed the strip an exact distance in each step to assure accurate registry of the eyelet openings with the eyelet-inserting and fastener-applying devices hereafter described.

For this purpose the strip 135 is provided with a series of marginal notches 151 intermediate openings 150, advantageously located outside of the button-forming areas and registering with feed pins 152 (Figures 7, 8, 11) mounted on feed bar 153 located below the strip guideway 137 with the pins 152, when in feeding position projecting upwardly through slots 154 in said guideway into engagement with registering notches 151 at opposite sides of strip 135. The strip is moved step by step by shifting pins 152 forwardly in slots 154 while in engagement with notches 151, then depressing the pins below strip 135, returning them to initial position and elevating them into engagement with the next set of notches 151.

Appropriate mechanism is provided for actuating pins 152 in this manner. The arrangement illustrated produces the feed and return movement of pins 152 through rock arm 155 (Fig. 5) pivoted to feed bar 153 and fixed to rock shaft 156 journaled on bracket 157 on frame 50. Rock shaft 156 carries a second rock arm 158 connected by drive link 159 (Figs. 1 and 5) to rocker arm 160 pivotally mounted on the frame and biased downwardly by spring 161, arm 160 carrying a roller 162 bearing against cam 163 on the front cam shaft 119.

A yieldable connection is advantageously provided in the linkage between the pins 152 and cam 153 to prevent damage in case of interference with the feed. A convenient arrangement for this purpose is shown, comprising a stud 164 on rock arm 158, vertically slidable in slot 165 in drive link 159 (Fig. 5) and biased upwardly by spring 166 attached at its ends to the end of arm 158 and to an upward extension of drive link 159.

The vertical component of movement of the pins 152 is produced by suitable actuation of rock arm 170 (Fig. 5) pivoted on bracket 146 and carrying roller 171, engaging the lower face of feed bar 153 and mounted on a stud 172, extending beyond the roller and traveling along a face of yoke 173 parallel to the lower face of feed bar 153 on which the yoke is mounted. Rock arm 170 is actuated through link 174 connected to rock lever 175 pivoted on bracket 176 and carrying roller 177 held against cam 178 on front cam shaft 119 by spring 179.

Figure 11:
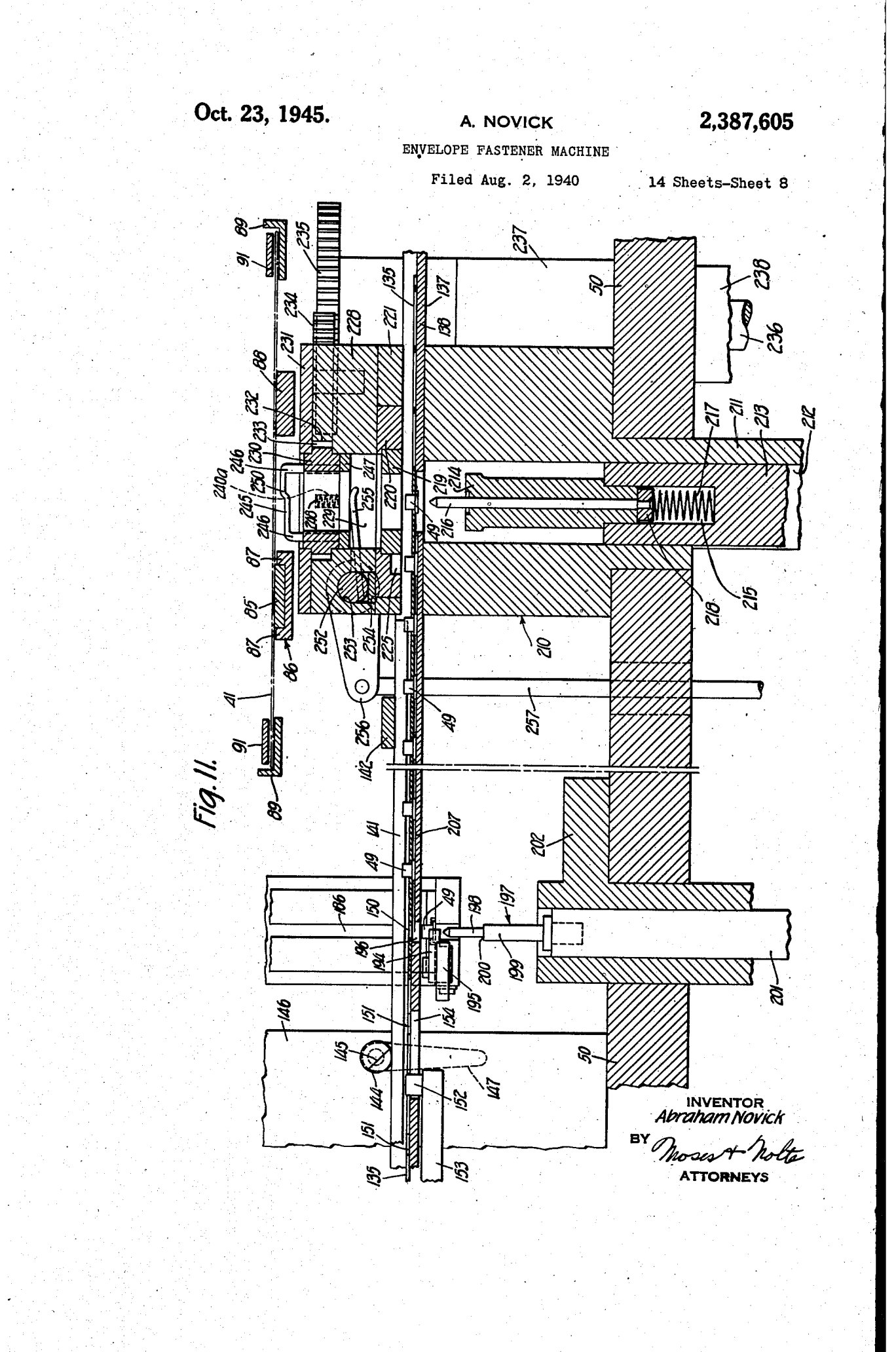

Cams 163 and 178 are contoured and synchronized to impart to feed bar 153 and pins 152 thereon an upward movement at the beginning of the cycle of operation, bringing the pins into engagement with notches 151 in strip 135, then moving the pins to the right (as seen in Figs. 7, 8 and 11) in slots 154 while in engagement with the button strip, for a distance equal to the distance between the eyelet openings 150, then lowering said bar and pins to clear strip 135 and returning the pins to the left below said strip to the point of beginning.

The width of strip 135 and the feed stroke of feed bar 153 are advantageously proportioned to the diameter of the button to provide around the openings in said strip from which the buttons have been excised a sufficient margin to produce a substantially continuous waste strip as shown in Figs. 7 and 11, which may travel along the channel 140 and beyond the end thereof to a suitable receptacle, thereby avoiding the accumulation of waste in the machine.

Means are provided for supplying eyelets; and the method and arrangement for supplying the eyelets to the point of application constitutes a feature of the invention. In the preferred form the eyelets are inserted in the button strip 135 before the buttons are punched therefrom, and the strip is utilized to convey the eyelets to the point where the buttons are formed. Means is provided for holding the eyelets in place in the strip, particularly at the point of insertion therein and at the point of application to the envelope, this means in the preferred form shown consisting of the margins of the apertures 150 in the strip into which the eyelets are inserted, said margins being proportioned and arranged to grip the eyelets and prevent them from falling or otherwise shifting out of position in the strip when the inserting mechanism is removed. This is especially important when the eyelets are inserted from below. In the illustrated embodiment the apertures 150 into which the eyelets are inserted are preformed; but this specific disclosure, while advantageous, is not intended to be restrictive.

Referring particularly to Figs. 1, 5, 7, 10 and 11, eyelets 49 are supplied in bulk through feed hopper 183 to the magazine 184 of known type in which the eyelets are fed to the upper end of a feed chute 185 provided with a gutter or guideway 186 along which the eyelets travel by gravity in continuous series. The positioning of the eyelets in chute 185 is assisted by an oscillating distributor of known type (not shown) located in magazine 184 and mounted on rock shaft 187 carrying rock arm 188 actuated by link 189 connected to reciprocating link 343 hereafter described.

Eyelet feed chute 185 and associated parts are mounted on bracket 146 on the frame of the machine. The lower portion 185a of chute 185 is pivotally connected to the upper part of the chute, so that the lower end thereof is movable toward and from the feed channel 140 for the strip 135. The appropriate movement is imparted through link 190 connecting the lower eyelet feed chute section 185a to a rocking lever 191 pivotally mounted on bracket 176 (Fig. 5) and carrying a roller 192 held against cam 193 on the front cam shaft 119. The eyelets 49 are arrested at the lower end of guideway 186 by swinging gate 194 (Figs. 7 and 11) yieldably held in place by spring 195; and at the beginning of the eyelet inserting operation the end eyelet, located against gate 194, is positioned beneath an opening 150 in strip 135 and a registering opening 196 in plate 138 (Figs. 8 and 11).

The eyelets are removed from the lower section 185a of the feed chute and inserted in button strip 135 by a rod or needle 197 having a reduced point section or shank 198 fitting the opening in the eyelet, and an enlarged body 199 forming a shoulder 200 adapted to engage the eyelet flange. Needle 197 is mounted on plunger 201 slidable in bearing 202 on frame 50, the plunger extending below the bearing and having an adjustable connection at its lower end with one end of a rock lever 203 (Figs. 1 and 5) pivoted on bracket 204 and carrying at its opposite end a roller 205 held against cam 206 on the front cam shaft 119.

In operation, the chute section 185a is located below guideway 137 with the end eyelet in line with an opening 150 in button strip 133, which is stationary, and needle 197 is in lower position clear of the eyelet and chute, as in Fig. 11. Plunger 201 is moved upwardly by cam 206, inserting the shank 198 in the end eyelet. The chute section 189 is then retracted by cam 193; and as the end eyelet 49 is held in place by shank 198, gate 194 springs out, releasing the eyelet and returning to check the succeeding eyelet in feed position. Needle 197 continues to rise, the shank 198 first entering the opening 150 in strip 135 and assuring alignment, the eyelet 49 being then forced into opening 150, which fits snugly against the shank of the eyelet. The tendency of strip 125 to rise during insertion of the eyelet is resisted by the hold-down bars 141 (Fig. 10). Plunger 201 and needle 197 are then retracted, leaving the eyelet frictionally held in the strip 135; and as the strip is advanced the flange of the eyelet below the strip travels in a suitable recess 207 in guideway base plate 138 (Figs. 8, 9 and 11). The chute section 185a is then swung back into position beneath guideway 137 for application of the next eyelet.

When an eyelet reaches the point of application, a button containing an eyelet is punched from strip 135, string is wound around the eyelet, and the eyelet is forced through the envelope flap and upset. Referring to Figs. 7 and 11, the guideway 137 extends through a head 210 mounted on frame 50. Head 210 includes a base 211 extending through a suitable mounting socket in the frame 50 and provided with vertical guideway 212 carrying vertically sliding plunger 213. Punch 214 is mounted in a socket 215 in the upper end of plunger 213, and carries an eyelet-engaging rod or needle 216 slidably mounted in a longitudinal bore in the punch and yieldably pressed upwardly by spring 217 in socket 215 bearing against block 218 which is attached to the end of needle 216 and is normally held against the inner end of the punch 214 by said spring.

The die 219 in die holder 220 is positioned above the button strip guideway 137 in register with punch 214, the die holder 220 being mounted in cap plate 221 attached to base 211 and suitably cut away to provide clearance for the passage of the strip guideway 137, which extends beyond plate 221 for discharge of the waste portion of strip 135 at the far side of the machine. The die holder 220 is also cut away to form a clearance recess 225 in register with the second eyelet in said strip.

Plunger 213 extends downwardly in guideway 212, (Figs. 1, 5 and 18) the lower part of which is open along one side. The lower portion of plunger 213 is connected through link 222 to an end of rock lever 223, pivoted at its opposite end on bracket 224 and carrying at an intermediate point, roller 225 held against cam 226 on front cam shaft 119 by a spring 226a. Said cam operates at the proper time to force plunger 213 upwardly from the position shown in Fig. 11, inserting needle 216 in the aligned eyelet 49 (Fig. 24), thereby assuring registry, and continuing upward with punch 214 engaging the lower face of strip 135 (the second eyelet entering the clearance recess 221 as strip 225 is lifted against die 129). Further upward movement of punch 214 cuts out the button 46 (Fig. 25). The upward travel of plunger 123 is halted with the end of needle 126 in engagement with the envelope flap (Fig. 26), the needle advantageously being materially depressed against spring 217; and the string is applied to the eyelet 49 before the button 46 is attached to the envelope flap.

A feature of the construction is the provision of an arrangement whereby the button and eyelet are held in stationary position during the winding of the string, permitting accurate and tight winding of said string around the shank of the eyelet. This arrangement has substantial advantages over constructions in which the string is wound about a traveling rod or needle carrying an eyelet and then rides up over the traveling eyelet shank.

Suitable means is provided for supplying string, cutting off an appropriate length 48 thereof, and winding the end of the string around the eyelet 49 or the needle 216 carrying the eyelet. In the form illustrated the string is applied by a ring or looper rotating around the eyelet 49, and is held in place while the eyelet is applied to the envelope flap. This arrangement includes a looper block 228 (Figs. 11 and 18) mounted on cap plate 221 and provided with a bore 229 in alignment with die 219, the bore forming a guideway for the annular looper 230, the upper portion of which fits rotatably in top plate 231. Looper block 228 is cut away at 232 to provide a runway for ring gear teeth 233 on the outer face of looper 230. Teeth 233 mesh with pinion 234 (Fig. 7) mounted in looper block 228 and driven by pinion 235 on the upper end of looper drive shaft 236 (Figs. 5, 11 and 18) mounted in bearing 237 forming part of base 211, the lower end of shaft 236 carrying miter gear 238 meshing with miter gear 239 rotatably mounted on bracket 240 and carrying sprocket 241 driven through chain 242 from sprocket 243 on the front cam shaft 119. The drive elements are advantageously proportioned to provide three revolutions of looper 230 for each revolution of cam shaft 119.

Referring particularly to Figs. 11 and 15–17, looper 230 is provided with a U-shaped thread clamp 245 having legs 246 slidable in suitable guide bores extending through looper 230, the lower ends of legs 246 being fixed to a clamp-actuating ring 247 fitting against the lower face of the looper 230 and normally biased away from said face, as by coil springs 248 set in suitable recesses 249a in the looper end symmetrically arranged about the axis thereof. The clamp legs 246 are connected by clamp bar 249 integral with the legs and advantageously provided with an elevated section 250, located at the lead end and extending for about a third of the length of the bar 249 and a trailing depressed clamping section 251 fitting against the looper face.

The thread clamp 245 is opened to receive the thread and closed to clamp it against 230 by a suitable arrangement engaging clamp actuating ring 247. The illustrated construction includes a rock shaft 252 (Figs. 7 and 11) mounted in a bore 253 in looper block 228, bore 253 extending through the lower face of block 228, for convenience in inserting and removing shaft 253, which is held in operative position by filler plate 254. Fingers 255, mounted on shaft 252 and extending through suitable openings in block 228, bear symmetrically against clamp ring 247. Rock arm 256 mounted on an end of shaft 252 is pivotally connected to rod 257 (Fig. 2) carrying fork 258 slidably engaging front cam shaft 119, and carrying roller 259 held against cam 260 on said shaft by spring 261.

Suitable means is provided for inserting the end of a string supply beneath thread clamp 235, holding the string in proper position during winding, and cutting off a suitable length of string from the supply. The string is drawn from a suitable source of supply such as the string roll 265 (Fig. 1) mounted on dispensing hanger 266 suspended on envelope magazine 52, and passes through guide 267 and tube 268 on frame 50, extending beneath the envelope conveyor.

An important problem in combining automatic envelope feed with mechanism for applying button and string type fastener members to the envelope involves the arrangement of the string supply for efficient operation without interference between the supply and the conveying mechanism. This is particularly true where the end of the string supply is wound around the eyelet or its support immediately adjacent the envelope, and therefore necessarily adjacent to the envelope feed mechanism.

In the preferred form this problem has been solved by providing a string supply mechanism which moves back and forth in a path sufficiently spaced at its rear end from the envelope path to permit provision of an appropriate string cutting device, and converging into the necessary close proximity to the envelope path at the point of string application.

In the construction illustrated the string emerging from tube 268 is engaged by suitable clamping and feeding mechanism on carriage 269 (Figs. 18–21) slidably mounted on guideways 270 carried by standards 271 on the frame 50. A string guide post 271a on the rear end of the carriage is provided with a bore through which the string passes to a clamping post 271 at one side of the string path, a swinging clamp dog 272 at the other side of the path, being provided with an inclined narrowed string-engaging end biased toward post 271 by spring 273. The string then passes through an elongated tapered feed tube 274 mounted in standard 275 on carriage 269. Guideways 270 slope upwardly toward the envelope path and the looper, and are arranged to position the end of feed tube 274 adjacent to and in alignment with the space between thread clamp 245 and looper 230 when carriage 269 is at the limit of movement toward the looper.

Suitable means is provided for reciprocating the carriage 269, the illustrated arrangement including a link 278 connecting a downwardly extending drive lug 279 on the carriage to the upper end of a rock arm 280 (Figs. 1, 5 and 18) mounted on rock shaft 281 journaled on frame 50 and carrying at its far end rock arm 282 connected by pitman 283 to crank 284 on the far end of front cam shaft 119. An adjustable connection between pitman 283 and rock arm 282 is advantageously employed to vary the length of travel of carriage 269. In the illustrated arrangement the pivot 285, connecting arm 282 and pitman 283 is adjustably clamped in slot 286 in arm 282; and pitman 283 is also adjustable in length, being threaded into adjusting head 287 engaging pivot 285.

The scissor assembly is mounted on scissor bar 290 (Figs. 20–23) rotatably mounted through axial sockets 291 in its ends fitting over pivot studs 292 removably mounted by set screws 293 in arms 294 depending from a guideway 270. The scissor assembly is adjustably clamped to bar 290, which is suitably shaped to prevent rotation of the assembly relative to the bar, the disclosed arrangement employing a square bar 290. The cutting mechanism is mounted on bracket 295 having a fork 296 slidably fitting three sides of bar 290 and a retaining plate 297, attached by screws across the end of the fork and fitting against the remaining side of bar 290. Set screw 298 serves to clamp the assembly in adjusted position.

The scissors are mounted on bracket 295 at the proper location such that when the bracket is swung inwardly the scissors will be swung over guideways 270 and into alignment with the string. In the construction shown this is accomplished by providing a plate 299 attached to the bracket 295, extending upwardly and then inwardly at right angles, the inner end of the plate being shaped to form a stationary scissors jaw 300. The movable jaw 301 is held in operative position by pivot 302 extending through plate 299, and is connected to an integral tail piece 303 biased downwardly by spring 304 and provided with a scissors-closing shoulder 305 positioned to engage the adjacent guideway 270 when the scissors assembly is swung inwardly.

An arrangement is provided for rocking bar 290 and the scissors assembly thereon in proper synchronism with the associated devices. The arrangement disclosed includes a forked bracket 306 with face plate 307 screwed thereto, fitting around bar 290 and held in place thereon by set screw 308. Rock arm 309 on bracket 306 is pivoted to rod 310 (Fig. 5) terminating in fork 311 slidable on front cam shaft 119 and carrying roller 312 held against cam 313 on said shaft.

The adjusting arrangements for the string supply mechanism that have been described permit the regulation of the position of the carriage at each end of its stroke and of the scissors relative to the retracted position of the carriage. They permit variation in the length of the piece of string 48 attached to the envelope as well as the extent to which the string projects from the mouth of tube 274, regardless of the retracted position of carriage 269.

At the beginning of the cycle of operation of the string applying mechanism the previously severed end of the string projects a short distance from the end of feed tube 274, and is held by clamp dog 272 against retraction as the carriage moves forward on guideways 270, drawing string from the supply 265. As the feed tube and projecting string end approach the looper 230, cam fingers 255 are elevated, lifting thread clamp 245 into the position indicated in Fig. 11. The rotation of looper 230 is synchronized with the travel of carriage 269 so that the point of the string is inserted beneath the elevated leading portion 250 of the thread clamp (Fig. 7), the slight elevation of said portion providing added room for insertion of the string, avoiding excessive elevation of the clamp and decreasing the chance of failure in locating the string accurately in the clamp.

As the looper 230 continues to rotate, the thread clamp 245 is lowered by descent of fingers 255, clamping the thread end between the lower section 251 of the clamp and the upper face of the looper, as indicated in Fig. 15. At this stage of operation the lower plunger 213 and associated parts are in the position indicated in Fig. 26, and remain in that position while the thread is wrapped around the eyelet for more than a full turn, as shown in Figs. 16 and 17. The plunger 213 then resumes its upward movement (Figs. 27 and 28) fastening the eyelet and thread in place; and simultaneously the thread clamp 245 releases the thread end.

Meanwhile the carriage 269 has been moved back along guideways 270, the string being unaffected by this movement since the clamp dog 272 is inclined forward and readily slides over the string pulled forward by clamp 245. After the feed tube 274 has cleared the scissor assembly, scissor bar 290 is rocked to move the scissor blades 300, 301 toward the string, the lower blade 300 passing below the string while the upper blade 301 extends above the string and is swung downwardly by engagement of shoulder 305 with a side of the guideway 307 to cut the string as shown in Fig. 23. The scissor bar 290 is then rocked back to return the scissor assembly to inactive position (Fig. 22) and the parts are ready to commence another cycle of operation.

Figure 5:
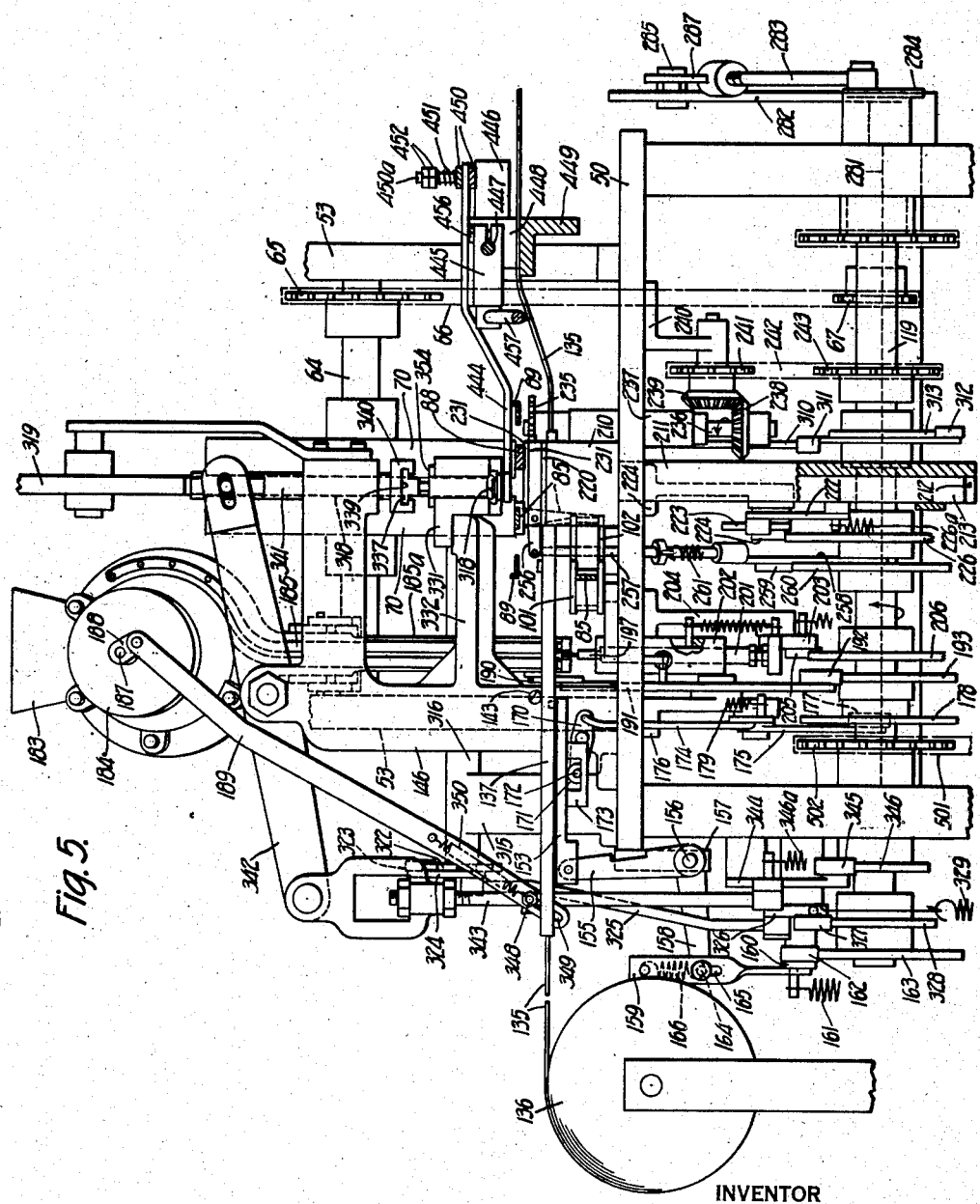
Fig. 5 is a transverse vertical sectional view taken from the right of Fig. 1.

In order to strengthen the flap fastener member a reenforcing patch is advantageously positioned on the upper face of the flap in register with the button, and receives the upset shank of the eyelet. An appropriate construction for this purpose is illustrated. The patches are cut from the end of a tape 318 fed from a roll 319 (Fig. 1) mounted on an extension of bracket 146 (Fig. 5). The tape 318 is fed in suitable increments by appropriate feed means, the illustrated arrangement including a feed roller 320 (Figs. 1, 3 and 5) and cooperating presser roller 321 rotatably mounted on offset bracket 315, the shaft 321a for the feed roller 320 extending to the near side of the machine through an elongated bearing 316 in said bracket and carrying a ratchet wheel 322 actuated by pawl 323 on oscillating pawl plate 324, rocked through link 325 by rock arm 326 pivoted to the frame 50 and carrying cam roller 327 held against cam 328 on shaft 119 by spring 329.

The tape 318 passes along a guideway 330 cut away to permit engagement of the tape by rollers 320, 321, and curving thence downwardly and forwardly along the lower face of patch block 331 (Figs. 29-31) mounted on arm 332 of bracket 146.

Suitable means is provided in association with patch block 331 for cutting off successive patches from the end of tape 318 and applying the patches to the upper face of the envelope flap in position for engagement by the eyelet. While these patches may be gummed and moistened as disclosed in my application No. 142,393, this is not essential and is not specifically shown in this disclosure. The patch cutting and applying means is associated with the upper eyelet feeding device, and is arranged to hold the end of tape 318 in position, cutting off an end portion of the tape to form a patch, and lowering the patch and the eyelet upsetting device into position against the envelope flap where they are maintained while the eyelet is forced through the flap and upset against the patch.

The arrangement disclosed for this purpose includes an eyelet upsetting rod 335 having a tip 336 suitably contoured in known manner for spreading and turning back the end of the eyelet shank to upset it against the patch. Rod 335 is threaded into block 337 and held in vertically adjusted position by lock nut 338. Block 337 is clamped in guideway 339 in crosshead 340 on plunger 341 (Fig. 5) vertically slidable in guideways on an arm of bracket 146 and reciprocated through rock lever 342 mounted on said bracket and driven through link 343 by cam lever 344 mounted on frame 50 and carrying roller 345 held against cam 346 on front cam shaft 119. The link 189 connected to the eyelet magazine 184 is yieldably connected to link 343, the arrangement shown including a stud 348 on link 343 working in slot 349 in link 189 and connected by a spring 350 to said link 189.

The patch severing and applying arrangement is mounted on block 337 on crosshead 340 (Figs. 29-31) surrounding upsetting rod 335, and is yieldably forced downward with said rod. The arrangement disclosed employs a patch plunger 354 having tapered sides vertically slidable in similarly shaped guideways 355 in block 331. Rod 335 fits slidably in a central bore 356 in plunger 354. An ear 357 on plunger 354 fits slidably over stud 358 on block 337 and is biased downwardly by coil spring 359 on the stud into lowermost position limited by nuts 360 threaded on the stud and constituting an adjustable stop for ear 357.

Patch plunger 354 carries suitable means engaging the end of tape 318 and holding it it place in register with the lower end of rod 335 during descent to upsetting position against the envelope flap. In the illustrated embodiment this arrangement includes rods 360 with patch holders 361 on their lower ends extending along the sides of the tape and provided with beveled tape-engaging faces 362 extending under the lower face of the plunger 354 in position to hold the end portion of tape 318 in place.

Rods 360 are provided with hooked upper ends 363 pivotally engaging pins 364, each extending across a vertical recess 371 in one of the opposite vertical margins of plunger 354. Presser rods 365 vertically slidable in bores 366 in block 354 bear against rod ends 363 engaging said ends at points outwardly offset from pins 364, and are biased downwardly by coil springs 367 in bores 366, held removably in place by screw plugs 368.

Each rod 360 is also biased inwardly by a leaf spring 369 held in place by a pin 370 extending across a recess 371, the upper end of the spring bearing against the inner wall of the recess and the lower end against the lower part of a rod 360. Recess 371 is extended inwardly opposite the hooked rod ends 363 to provide clearance for said ends.

A cutter blade 375 is removably mounted on the forward face of patch plunger 354 in line with the end of the lower cutter plate 376, which has beveled margins fitting into a recess 377 formed between the lower part of patch block 331 and a clamp plate 378, which also engages and holds the tape guideway 330 in place, plate 378 being removably mounted on block 331 by screws 379.

The operation of the device for applying the patch to the upper face of the envelope flap and upsetting the eyelet to hold the fastener element in place will now be described, commencing with the parts below the flap in the position shown in Fig. 26 and parts above the flap in the position shown in Figs. 30 and 31. Pawl 323 (Fig. 1) is actuated to feed a suitable length of patch tape 318 beneath patch plunger 354. Crosshead 340 descends, blade 375 cutting off a patch from the end of tape 318, which is held in place by patch holders 361 until the holders contact the upper face of the flap, which forces them upward and outward, beveled faces 362 riding over the adjacent edges of the lower face of plunger 354, which then holds the patch firmly against the envelope, the plunger 354 yielding sufficiently against spring 359 to position the upsetting rod tip 336 at the proper point for turning the eyelet shank.

Meanwhile the lower plunger 213, after the dwell necessary for applying the string, resumes its rise from the position shown in Fig. 26, forcing the eyelet through the envelope flap and upsetting it against the rod tip 336 in the position shown in Figs. 27 and 28. Plunger 213 and crosshead 340 then return to their original position.

During the formation and application of the button fastener elements to the envelope flap, a button fastener is also applied to the envelope body. The arrangement for this purpose includes generally the combination of button strip feeding and eyelet inserting means similar to those employed for the flap fastener, except that the eyelet is inserted from the top; button punching and applying means located above the envelope; an anvil inserted within the envelope for upsetting the eyelet; and an anvil support below the envelope.

The button material is fed in a continuous strip 380 from a supply roll 381 (Fig. 6) mounted at the side of the machine, and travels along a guideway 382 mounted on the frame 374 of carriage C and extending beyond the point of fastener application to a point suitable for discharge of the waste portion of strip 380 at the far side of the machine. The guideway 382 is similar in construction to guideway 137 and includes base plate 383 and side flanges 384 (Fig. 34), with similar hold-down bars 385 mounted on cross-bars 386 resting on flanges 384.

The eyelets are fed from a suitable magazine and distributor (not shown), which may be of the same general type as magazine 184, and travel downwardly in feed chute 387 provided with a suitable guideway or gutter 388 of usual type engaging the eyelet flanges. The lower part 389 of feed chute 387 is hinged for movement toward and from button strip guideway 382, without breaking the continuity of eyelet guideway 388, and is shifted by link 390 (Fig. 2) connecting the chute section 389 to a rocking lever 391 pivoted on shaft 391a on carriage frame 374, said lever 389 carrying a roller 392 held against cam 393, on rear cam shaft 115. A suitable gate construction (not shown) which may be similar to that described in connection with chute 185, is provided on the end of the lower part 389 of the feed chute, which is curved toward the feed end of the machine to bring the eyelets into applying position with the shanks downward.

The button strip 380 is fed along guideway 382 by the same type of mechanism employed for feeding strip 135. The feed pins 396 mounted on feed bar 397 (Fig. 6) receive their horizontal component of movement through rock arm 398 pivoted to feed bar 397 and fixed to rock shaft 399 journaled in brackets 400 on the carriage frame 374, said shaft carrying a rock arm 401 engaging rod 402 attached to fork 403, slidable on the rear cam shaft 115 and carrying roller 404 held against cam 405 on said shaft. A yieldable connection is advantageously provided in the drive linkage just described, the arrangement illustrated including a stud 405a on rock arm 401 working in a slot in the upper end of rod 402 and normally held against the upper end of the slot by spring 395.

The vertical component of movement of feed bar 397 is imparted through a roller 406 engaging the lower face of the bar and mounted on stud 407 extending beyond the roller and traveling along a face 408 of yoke 409 parallel to the lower face of feed bar 397 on which the yoke is mounted. Stud 407 is mounted on rock arm 410a on rock shaft 410 journaled in bracket 411 on cross frame 412 mounted on the carriage frame 374. Rock shaft 410 carries rock arm 413 connected by link 414 to rock lever 415 also pivoted on the shaft 391a and carrying roller 416 held against cam 417 on rear rock shaft 115 by spring 418. Operation of the mechanism for feeding strip 380 is identical with that of the similar arrangement for feeding strip 135.

The arrangement for applying eyelets to button strip 380 is indicated in Figs. 34 and 35 and includes a plunger 422 reciprocating in arm 423 of cross frame 412 and connected to rocking lever 424 (Fig. 6), which is pivoted on said frame 412 and connected at its other end through link 425 to cam lever 426 pivotally mounted on carriage frame 374 and carrying roller 427 held against cam 421.

Plunger 422 carries a rod or needle 428 having a point section or shank 429 of reduced diameter adapted to pass through the shank of an eyelet, and a shoulder 430 adapted to engage the eyelet flange. The shank 429 is of sufficient length to extend at least from an eyelet in chute section 389 to the button strip 380 before shoulder 430 engages said eyelet.

In applying an eyelet to the strip 380 after the latter has been shifted to present an opening 150 in line with needle 428 and the eyelet 45 in the end of chute 389, plunger 422 descends, inserting the needle point section 429 through the end eyelet in said chute, the point section continuing substantially to button strip 380 before the chute 389 is retracted, leaving the eyelet on said point section. If the eyelet slides downwardly along the point section 429, it will not affect the operation since the eyelet will be held in proper registered position by said point section, which travels downwardly through aperture 431 in the base plate 383 of the guideway 382 until the shoulder 430 has forced the eyelet 45 into aperture 150 in button strip 380 with the eyelet flange resting against the upper face of the strip as shown in Fig. 35. Plunger 422 is then retracted to its original position and the inserted eyelet 45 is advanced with said strip 380 to the point of application, the portion of the eyelet shank projecting beneath strip 380 traveling in channel 432 in guideway base plate 383.

A suitable anvil is inserted in the envelope to provide means for upsetting the eyelets. In the illustrated arrangement, and referring particularly to Figs. 2, 4, 6 and 32–36, the anvil 434 is tongue-shaped, with rounded margins to facilitate entry into the envelope, and carries an eyelet upsetting button 435 of the usual contour. A stripping plate 436 is hinged to the front end of anvil 433 by pintle 437 passing through ears 438 on plate 436, and is biased upwardly by coil spring 439 mounted in socket 440 in anvil 434, the springs extending around stud 441 on the lower face of plate 437. The latter plate is provided with an opening 442 in register with upsetting button 435 arranged so that plate 436 clears the button when forced downward against anvil 434; and the upward movement of said plate is limited by engagement of its forward tip 443 with the underlying face of anvil 434 when the plate rises to a height sufficient to strip the adjacent envelope and fastener parts from button 435.

The anvil 434 constitutes the end portion of an arm 444 (Figs. 4, 5 and 6) extending forwardly from the anvil above the envelope path and then curved laterally and upwardly toward the side of the machine where it is fixed to a block 445 clamped on rod 447 slidable in spaced bearings 448 in brackets 449 and 412 on the carriage frame 374.

A yieldable connection is provided in the mounting of the anvil to permit the slight movement incident to the eyelet upsetting operation. In the form illustrated this is provided by extending the end of arm 444 into slidable engagement with adjacent faces of bars 450 (Figs. 4 and 5) mounted slidably on studs 450a carried by blocks 446 and biased downwardly by coil springs 451 on said studs, bearing against adjusting nuts 452 threaded thereon. This arrangement serves to hold the anvil 434 normally in upper position but permits it to yield downwardly during clinching of the body fastener eyelet.

Appropriate means is provided for shifting the anvil 434 into and out of operative position within the envelope by reciprocating the rod 447. For this purpose block 445, adjustably clamped to rod 447 by screw 456 is connected by link 457 to rock lever 458 pivoted on bracket 459 on the carriage frame 374 and carrying roller 460 held against cam 461 on rear cam shaft 115.

A suitable support is provided beneath the envelope in register with the operating position of the anvil to receive the force of the eyelet-upsetting blow. This is shown as consisting of pillar 462 (Figs. 6 and 34) mounted on the carriage frame 374 and extending between the belt-supporting bar 86 and rail 88, pillar 462 having a flat upper face 463 located immediately below the lower surface of the envelope 40 and in register with the upsetting button 435 on the anvil.

A suitable arrangement is provided for opening the mouth of the envelope to facilitate insertion of anvil 434. The illustrated arrangement for this purpose is similar to that shown in my pending application No. 142,393 and comprises fingers 464 (Fig. 6) located between bar 86 and rail 88 and a short distance rearwardly from the front edge of the upper face of the envelope body 41 adjacent anvil 434 and from the tip of the anvil. Means is provided for projecting fingers 463 upwardly against the envelope, comprising rod 465 on which fingers 464 are mounted, the rod being slidable in bracket 466 on the carriage frame 374 and appropriately connected to rock arm 467 fixed on rock shaft 391a journaled in bracket 468 on the carriage frame 374 and carrying rock arm 470 provided with roller 471 held against cam 472 on rear cam shaft 115.

Means is provided for punching a body fastener button from strip 380, applying the button and an eyelet carried thereby to the envelope body, and upsetting the eyelet through said body to hold the button in place. Referring particularly to Figs. 6, 34 and 36, plunger 475, slidably mounted in head 476 on cross frame 412, carries punch 477 set into bore 478 in the plunger and provided with a recess 479 arranged and proportioned to fit the flange of eyelet 45. The punch 477 carries needle 480 slidably mounted therein and provided with a head 481 at its inner end normally held against the adjacent end of punch 477 by spring 482 located in bore 478. Needle 480 is in alignment with the eyelet 45 in opening 150 in a button strip 380 when the strip is in position for button attachment.

Head 476 is cut away to receive the button strip guideway 382, which projects beyond said head for discharge of the waste portion of strip 380. Die 483 registering with punch 477 is mounted on the lower end of head 476, and specifically is set into a socket formed in a bottom plate 483a removably mounted on the main portion of head 476, plate 483a being cut away to receive and support the button strip guideway 382. Die 483 extends upwardly through base plate 383 of the guideway into alignment with the lower surface of strip 380, the die being cut away at 484 to permit passage of the eyelet shank into operating position.

Suitable means is provided for reciprocating plunger 475 (Figs. 4, 6), the arrangement illustrated comprising a rocking lever 485 on cross frame 412, connected at one end through slot 486 and pin 492 to plunger 475, and at the other end through universal connection 487 and link 488 to rock lever 489 pivoted on carriage frame 374 and carrying roller 490 held against cam 491 on rear cam shaft 115.

At the commencement of the operations for affixing the button fastener to the envelope body the anvil 434 is located above and close to the envelope flap adjacent to the opening of the envelope, and the plunger 475 is in upper position as shown in Fig. 34. Fingers 464 are moved upwardly against the lower face of the envelope a short distance to the rear of the envelope mouth and the anvil tip; and as they rise while the anvil 434 holds the envelope flap down, the upper ply of the envelope body adjacent the envelope mouth is lifted away from the lower ply, opening said mouth. The anvil 434 then advances into the open envelope mouth, and as soon as it has entered fingers 463 are depressed to permit the anvil to continue its movement into operative position with eyelet-upsetting button 435 in alignment with needle 480 and with an eyelet 45 located in an opening 150 in button strip 380.

Plunger 475 then descends, needle 480 entering the eyelet 45 and contacting the upper surface of the envelope body, yielding during further downward movement of plunger 475 and punch 477, which punches the button 44 from strip 380, forces the eyelet 45 in the button through the envelope body and upsets the eyelet shank against the inner surface of the body as shown in Fig. 36. The pressure of punch 477 against the envelope body forces stripper plate 436 down against the face of anvil 434 and forces said anvil downwardly until it is arrested by the upper surface 463 of pillar 462 engaging the lower face of the envelope, the yieldable mounting of bar 435 on studs 450a permitting the depression of anvil 434.

After the button fastener member is attached, plunger 475 rises, the anvil 434 being lifted to normal position by springs 451, and stripper plate 436 being elevated by spring 439 to free the eyelet and envelope from button 435 and eliminate any resistance to continued progress of the envelope to discharge. Anvil 434 is retracted beyond the envelope mouth to starting position.

It has been indicated that all of the various mechanisms employed for attaching a button fastener to the envelope body are mounted either on the carriage frame 374 or on parts such as cross frame 412 or rear cam shaft 115 carried by said carriage frame. A suitable arrangement is provided for adjusting carriage frame 374 longitudinally to vary the spacing between the points of application of the body fastener and flap fastener respectively. In the form shown, the carriage frame 374 is slidably supported on rails 495 of the main frame 50 (Figs. 2 and 6) and is held in place by demountable racks 496 meshing with pinions 497 formed in carriage-adjusting shaft 498 journaled in carriage frame 374 and provided with a projecting head 499 shaped to fit a wrench or crank socket.

The rear cam shaft 115 journaled on carriage frame 374 is driven through sprocket 500 on shaft 115 by chain 501, the upper run of which passes over sprocket 502 on front cam shaft 119, thence around sprocket 503 on stub shaft 99 carried by frame 50 and back around sprocket 504 on stub shaft 505 carried by carriage frame 374, to sprocket 500. The runs of chain 501 extending between sprocket 500 and sprocket 502, and between sprocket 503 and sprocket 504 are advantageously parallel to the direction of movement of the carriage frame 374, an arrangement which maintains chain 501 at the same tension regardless of adjustments of the carriage.

In order to maintain the mechanism on carriage C for applying the body button fastener member in synchronism with the mechanism on the main frame 50 for applying the flap button fastener member, unaffected by adjustment of carriage C, sprocket 500 is held in fixed position on shaft 115 by set screw 500a which can be released to permit the sprocket to turn without rotating said shaft during changes in the position of carriage C. This arrangement also permits any necessary correction in the exact timing of the body fastener member applying mechanisms in respect to the timing of the flap fastener member applying mechanisms.

The drive connections between the various shafts have in general been set forth; and the machine may be operated by connecting a suitable source of power (not shown) to any of the interconnected shafts such as front shaft 68. While many springs have been indicated, others have been omitted for the sake of clearness, as their construction and arrangement are obvious, especially in holding cam rollers against cams.

The operation of the various parts of the machine has been described; and such operations are appropriately synchronized to complete the entire cycle of attachment of button fasteners to the flap and to the body of the envelope simultaneously during one revolution of the cam shafts 115 and 119. The operation of the feeding mechanism is synchronized to supply an envelope to the conveyor belt 85 in appropriate relation to each cam shaft revolution, and the belt speed is appropriate to deliver the envelope against stop 105 when the button applying mechanisms are in inactive position at the commencement of their cycles of operation already set forth. The mechanism for attaching the body button fastener member is timed to conclude its operations not later than the end of the operations involved in attaching the flap button fastener member, so that the total dwell of the envelope at the operating station is determined by the time necessary to attach the button fastener to the flap. The various adjustments have been indicated; and it will be noted that the position of the body fastener on the envelope may be varied by coordinated adjustment of stop 105 and carriage frame 374.

I have described what I believe to be the best embodiments of my invention. I do not wish, however, to be confined to the embodiments shown, but what I desire to cover by Letters Patent is set forth in the appended claims.

I claim:

1. A machine for attaching button fasteners to envelopes, comprising a continuous conveyor; means for supplying envelopes with open flaps downward and in trailing position successively and in timed relation to the conveyor; means for arresting the envelopes successively and in timed relation at a fastener applying station; means at said station for applying a button and string fastener member to the lower face of the envelope flap including button supply means, eyelet supply means, and string supply means located below the conveyor, and eyelet upsetting means located above the conveyor; and means at said station for simultaneously applying a button fastener member to the top face of the envelope back, including an anvil, means for inserting the anvil in the envelope body, and button and eyelet supplying and applying means located above the conveyor.

2. A machine as set forth in claim 1 in which each eyelet is inserted from the top and is conveyed to the applying station with the eyelet flange extending over the upper face of the button-forming unit.

3. A machine as set forth in claim 1 in which each eyelet is inserted upwardly through the button-forming unit and is held in place by frictional engagement with the unit during conveying.

4. A machine as set forth in claim 1 including a guideway for the button-forming material in which each unit of said material is located during insertion of an eyelet therein.

5. A machine as set forth in claim 1 including a guideway for the button-forming material and means for holding each unit of said material in the guideway against displacement during insertion of the eyelet in said unit.

6. A machine for applying button fastener members to sheet material comprising means for locating attaching elements in succession on a strip of button material, means for feeding successive portions of the strip, each carrying an attaching element to a button forming station, means at said station for forming from each of said portions a button carrying an attaching element, and means for attaching said button to the sheet material by the associated attaching element to form a fastener member.

7. A machine as set forth in claim 6, in which the attaching elements are initially inserted in a series of preformed apertures in the strip of material.

8. A machine as set forth in claim 6, in which the attaching elements are eyelets inserted in the strip and held in place therein during feeding to the button forming station.

9. A machine for applying button fastener members to sheet material comprising means for inserting attaching elements in succession to a strip of button-forming material, means for feeding successive portions of the strip each carrying a fastener element to an applying station, and unitary means at said station for forming from each of said portions a button carrying an attaching element and attaching the button by means of said element to the sheet material.

10. A machine for applying button fastener members to sheet material, comprising means for applying fastener elements in succession to a strip of button material; means for forming buttons from successive portions of the strip, each carrying a fastener element, and attaching the buttons by means of the fastener elements; and means for feeding said portions successively from the fastener element applying means to the button forming means, including intermittently operated means engaging successive recesses in the strip.

11. A machine as set forth in claim 10 in which the intermittently operated means is arranged to engage transversely aligned pairs of apertures in the strip located adjacent opposite margins intermediate the points of application of successive attaching elements to the strip.

12. A machine as set forth in claim 10, in which the strip is provided with a succession of apertures each located in the center of a button-forming portion and proportioned for frictional engagement with an eyelet shank, and in which the recesses in the strip are separate from the eyelet-fitting apertures.

13. A machine as set forth in claim 10 in which the feed means is out of engagement with the strip during engagement of said strip by the button forming and applying means.

14. Apparatus for positioning attaching elements in units of button-forming material comprising a guideway, means for feeding a succession of button-forming units of said material along the guideway, means for feeding a succession of attaching elements into applying position in register with button-forming units in the guideway, and means for applying an attaching element to each button-forming unit in the guideway at a point intermediate the ends of the guideway.

15. Apparatus as set forth in claim 14 adapted to handle attaching elements in the form of eyelets, in which the applying means is constructed and arranged to pass the shank of each eyelet through a button-forming unit in the guideway.

16. Apparatus as set forth in claim 14 adapted to handle the button material in strip form, in which means are provided for forming an individual button from each unit of button-forming material after an attaching element has been applied to it.

17. A button strip of sheet material suitable for forming the button elements of button fasteners, provided with a series of eyelet-fitting apertures, each located in the center of a substantially unbroken area at least as large as the button element to be formed therefrom, and feed apertures in said strip located outside of the button-forming areas.

18. A machine for applying button and string fastener members, comprising a conveyor for successively delivering envelopes or the like to an applying station, means at said station for applying the fastener members to the envelopes, means for applying string to each fastener member prior to said application, and means for supplying string to said string applying means, comprising a carriage reciprocating in a path adjacent to and in alignment with the conveyor and inclined toward the conveyor in the direction of the point of application.

19. A machine for applying button and string fastener members, comprising means for attaching a fastener member, means for applying string to the fastener member prior to said attachment, and means for supplying string to the applying means, including a reciprocating feed tube and means for yieldably holding string in position in the tube with an end of the string projecting from the feed end of the tube.

20. In a machine for applying button and string fastener members, a rotating looper for winding string around a fastener member assembly prior to application thereof, including a thread clamp extending along an operative face of the looper and movable toward and from said face for receiving and clamping a string end, the clamp including a trailing portion movable into close thread-clamping engagement with the looper, and an advance portion having its lower face deflected away from said looper face and arranged to provide increased space for entrance of the string end beneath the advance portion of the clamp.

21. In a machine for applying button and string fastener members, a rotating looper for winding string around the fastener member assembly prior to application thereof, comprising a string clamp having an operative portion extending along a face of the clamp and a support slidably mounted in the looper and extending beyond an opposite face thereof; a clamp actuating ring engaging the support; spring means for biasing the ring away from the looper; and means for opening and closing the string clamp, comprising a member slidably engaging the ring and movable toward and from the looper, and means for moving the member.

22. In a machine for attaching button and string fasteners, a reciprocating string supply carriage, a guideway for the carriage, string cutting scissors, a support for the scissors extending lengthwise of the guideway, a scissors carrier longitudinally adjustable along the support substantially in parallelism with said guideway, means for securing the carrier in different positions of adjustment, and mechanism for actuating the scissors in all adjusted positions.

23. A machine as set forth in claim 22 which includes means for varying the retracted position of the carriage and thereby varying length of the string supplied at an operating stop.

24. A machine for applying fasteners to envelopes comprising an envelope conveyor, fastener applying means operative along the center line of the path of envelopes on the conveyor, said conveyor consisting of a single conveying belt having an envelope-engaging run laterally offset from said line beyond the zone of operation of the applying means, and marginal guides for the envelopes.

25. A machine for attaching button fastener members to envelopes, comprising means for mechanically feeding envelopes in succession along a predetermined envelope feed path to a fastener member applying station with the envelope flap open, means at said station for delivering a button and string fastener and an eyelet to the outer face of the open envelope flap at one side of the feed path, means at said station for attaching the button and string fastener member to the envelope flap by upsetting the eyelet through the button and the envelope flap, means for delivering a button fastener member and an eyelet to the outer face of the envelope back at the other side of the feed path, and means for attaching the latter button fastener member to the envelope back simultaneously with the attachment of the first by upsetting he second eyelet through the second button and the envelope back, and means for causing the envelope feeding and the operation of the attaching means to be effected in timed relation with one another.

26. A machine for applying button fastener members to sheet material comprising means for applying attaching elements successively to button material at an assembly station, means at an attaching station distinct from the assembly station for attaching successive units of the button-forming material, each to the sheet material, by means of an associated attaching element to form a button fastener member, and means for conveying the button-forming material to transfer the successive units of said material, each with its associated attaching element, from the assembly station to the attaching station.

27. A machine as set forth in claim 26, adapted for acting upon button material having preformed apertures, in which the means for applying the attaching elements to the button material comprises means for aligning each fastener with a preformed aperture of the button material and inserting it therein.

28. A machine for applying button fastener members to sheet material comprising means at an attaching station including a reciprocating driver for attaching units of button material to the sheet material by means of associated eyelets to form button fastener members, means at an assembly station which is located at a substantial distance from the driver path for inserting eyelets into successive units of the button-forming material, and means for conveying the eyelet carrying units transversely of the driver path from the assembly station to the attaching station.

29. A machine for applying button fastener members to sheet material comprising, in combination, means defining a predetermined path for a notched strip of button material, means for positively feeding said strip along said path through steps of predetermined length including feeding elements engageable in said notches, means at a first station along said path for inserting attaching elements in successive units of said strip, and means at a second station along said path for forming individual buttons from the successive units and attaching them through the associated attaching elements to the sheet material.

30. Apparatus as set forth in claim 14 in which the feeding means is constructed and arranged to advance the button-forming material intermittently and the applying means includes a reciprocable member insertible through a button-forming unit, and means for thrusting said member through a button-forming unit to apply an attaching element and then retracting said member in each interval between feeding steps.

31. A machine for attaching fasteners to envelopes comprising means for attaching a fastener member to an envelope flap; means for simultaneously attaching a fastener member to the body of said envelope; a carriage on which one of said means is mounted, said carriage being movable to vary the spacing between the fastener elements; synchronizing drive connections between the attaching means, a continuous envelope conveyor, means for feeding envelopes in succession to the conveyor in synchronism with the attaching means, and means for arresting each envelope on the conveyor in longitudinally adjustable position during fastener application.

32. A machine for attaching fasteners to envelopes comprising means for attaching a fastener member to an envelope flap; means for simultaneously attaching a fastener member to the body of said envelope; a carriage on which one of said means is mounted, said carriage being movable to vary the spacing between the fastener elements; a cam shaft mounted on the carriage and operatively associated with the attaching means on the carriage; a fixed cam shaft operatively associated with the other attaching means; and synchronizing drive connections between the cam shafts.

33. In a machine of the kind described, having mechanism for performing an operation on each of a succession of articles of the envelope type at an operating station; in combination, a conveyor belt cooperative with said mechanism, having a feed run and a return run, for feeding articles successively to the operating station, the feed run of the belt traveling adjacent to said mechanism at the operating station, and the return run having the ends thereof in line with said mechanism, and means for deflecting the belt return run around said mechanism.

ABRAHAM NOVICK.